(12) United States Patent
Muramatsu et al.

(10) Patent No.: US 8,110,312 B2
(45) Date of Patent: Feb. 7, 2012

(54) FUEL CELL SYSTEM AND STARTING METHOD THEREFOR

(75) Inventors: Yasuyuki Muramatsu, Shizuoka (JP); Masatsugu Oishi, Aichi (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 563 days.

(21) Appl. No.: 11/814,616

(22) PCT Filed: Jan. 20, 2006

(86) PCT No.: PCT/JP2006/300858
§ 371 (c)(1),
(2), (4) Date: May 26, 2009

(87) PCT Pub. No.: WO2006/077971
PCT Pub. Date: Jul. 27, 2006

(65) Prior Publication Data
US 2009/0274934 A1     Nov. 5, 2009

(30) Foreign Application Priority Data
Jan. 24, 2005   (JP) .................................. 2005-015190

(51) Int. Cl.
  *H01M 8/04* (2006.01)
(52) U.S. Cl. ..................................................... 429/430
(58) Field of Classification Search ........... 429/430–432
  See application file for complete search history.

(56) References Cited

U.S. PATENT DOCUMENTS

| | | | |
|---|---|---|---|
| 5,964,309 A | 10/1999 | Kimura et al. | |
| 6,158,537 A | 12/2000 | Nonobe | |
| 6,672,415 B1 | 1/2004 | Tabata | |
| 6,815,100 B2 | 11/2004 | Aoyagi et al. | |
| 7,028,795 B2 | 4/2006 | Tabata | |
| 7,883,812 B2 * | 2/2011 | Muramatsu | 429/447 |
| 2001/0051291 A1 | 12/2001 | Aoyagi et al. | |
| 2003/0180583 A1 | 9/2003 | Ichikawa et al. | |
| 2003/0194586 A1 | 10/2003 | Sugiura et al. | |
| 2004/0185317 A1 | 9/2004 | Aoyagi et al. | |
| 2006/0113129 A1 | 6/2006 | Tabata | |
| 2009/0130497 A1 * | 5/2009 | Oishi et al. | 429/13 |

FOREIGN PATENT DOCUMENTS

| | | |
|---|---|---|
| JP | 09-231991 A | 9/1997 |
| JP | 10-40931 A | 2/1998 |
| JP | 10-40962 A | 2/1998 |
| JP | 11-176454 A | 7/1999 |

(Continued)

OTHER PUBLICATIONS

Official Communication issued in corresponding European Patent Application No. 06 712 083.2, mailed on Mar. 8, 2011.
Official communication issued in counterpart European Application No. 06712083.2, mailed on Apr. 23, 2009.
Official communication issued in the couterpart International Application No. PCT/JP2006/300858, mailed on May 2, 2006.

(Continued)

*Primary Examiner* — Tho D Ta
(74) *Attorney, Agent, or Firm* — Keating & Bennett, LLP

(57) ABSTRACT

A fuel cell system and a starting method therefore prevent problems when the system is started. The fuel cell system includes a fuel cell, a secondary battery that is electrically connected with the fuel cell, and a cell temperature sensor that detects a temperature of the fuel cell. Energy which is necessary for starting the fuel cell system is calculated based on the temperature of the fuel cell detected by the cell temperature sensor. The calculated value is used as a threshold for determining a start-up mode of the fuel cell system.

9 Claims, 22 Drawing Sheets

FOREIGN PATENT DOCUMENTS

| | | | |
|---|---|---|---|
| JP | 2001-224105 A | 8/2001 |
| JP | 2001-266917 A | 9/2001 |
| JP | 2001-357865 A | 12/2001 |
| JP | 2002-34171 A | 1/2002 |
| JP | 2003-068339 A | 3/2003 |
| JP | 2003-303605 A | 10/2003 |
| JP | 2004-55379 A | 2/2004 |
| JP | 2004-247164 A | 9/2004 |
| JP | 2005-100694 A | 4/2005 |
| WO | 2004/042854 A2 | 5/2004 |

OTHER PUBLICATIONS

Oishi et al.; "Fuel Cell System and Starting Method Therefor"; U.S. Appl. No. 11/814,630; filed Jul. 24, 2007.

Translation of the official communication issued in the counterpart International Application No. PCT/JP2006/300858, mailed on Aug. 2, 2007.

Official Communication issued in corresponding Japanese Patent Application No. 2006-553970, mailed on Sep. 27, 2011.

* cited by examiner

FIG. 5
(a)
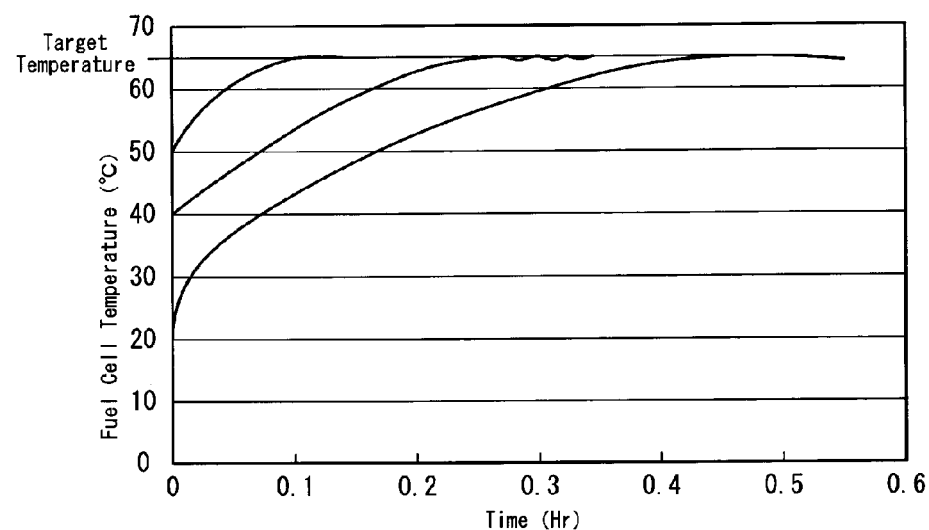
(b)
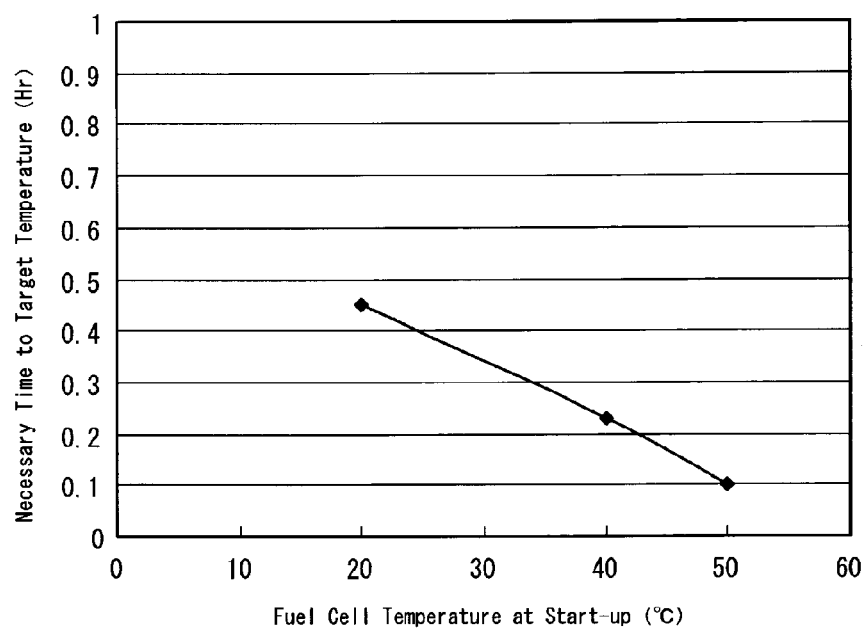

FIG. 8
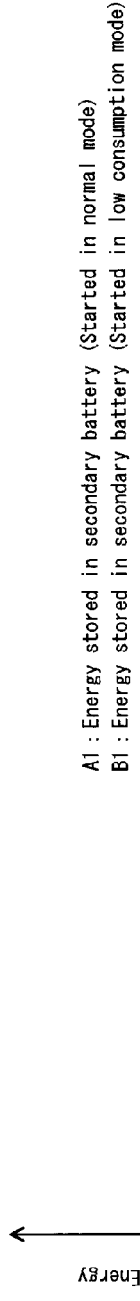
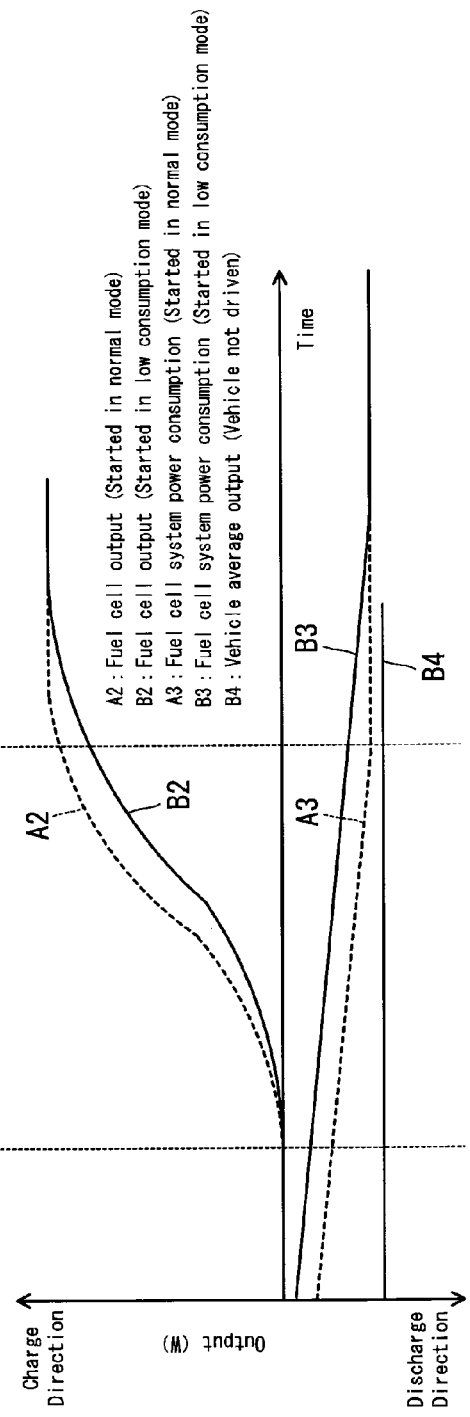

FIG. 9
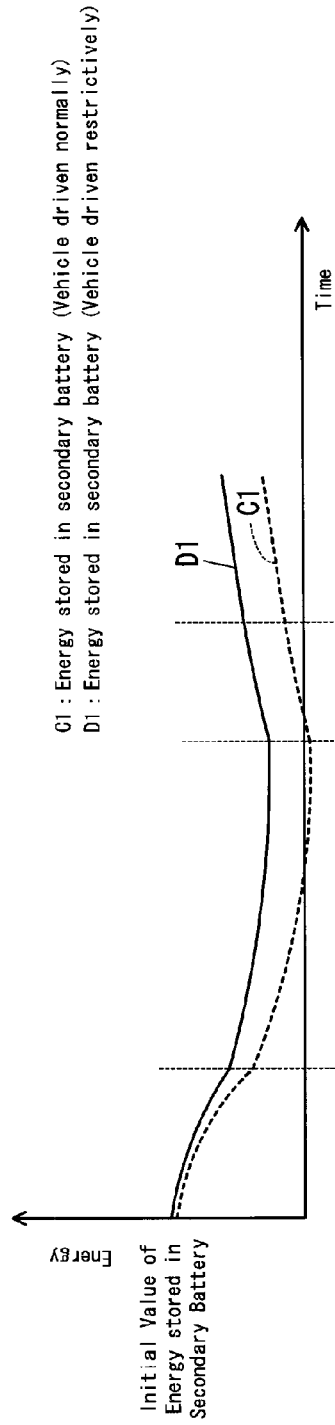
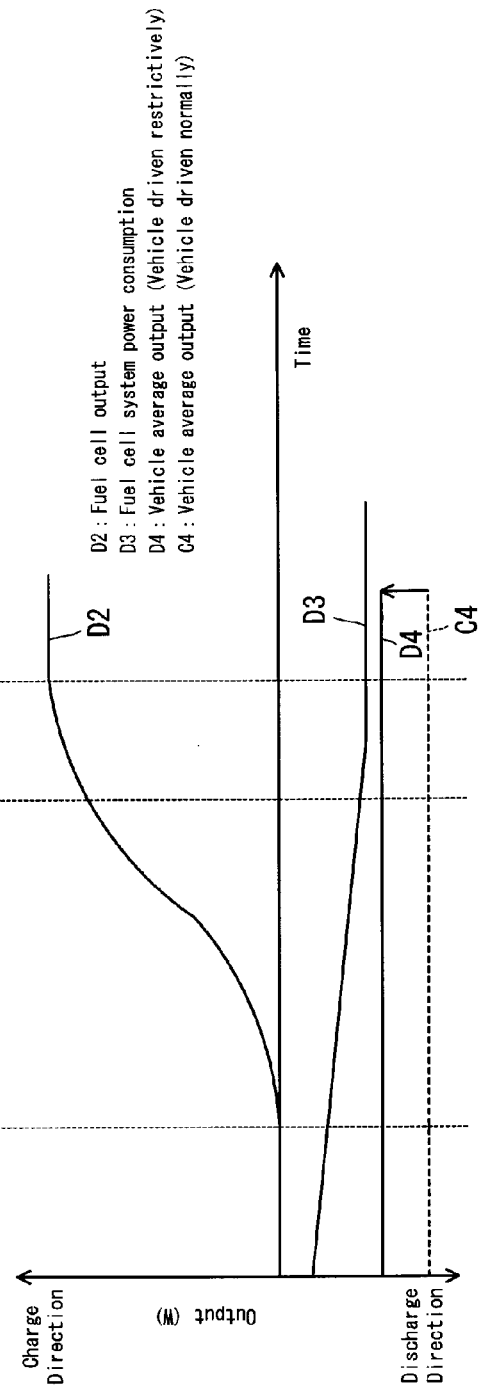

FIG. 10
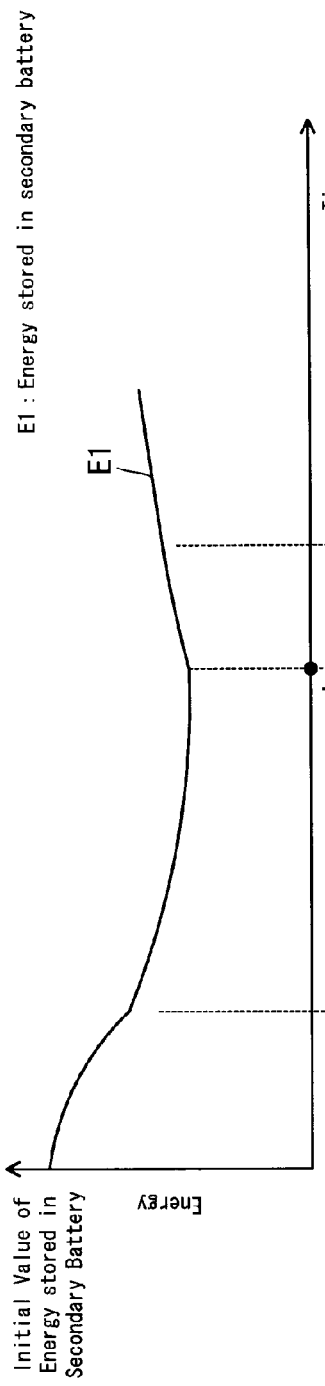
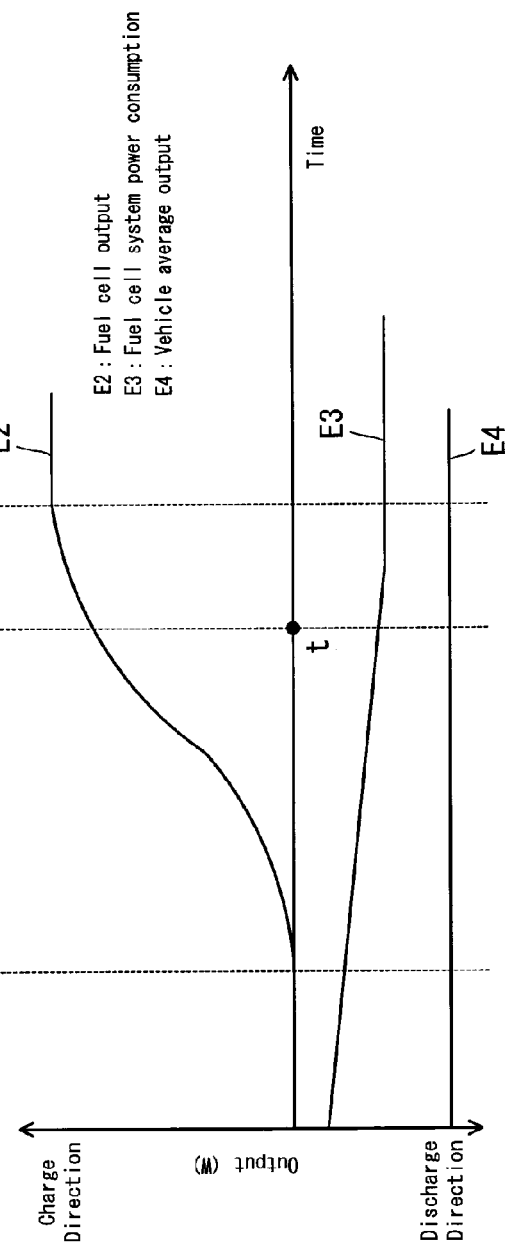

FIG. 11
(a) Restriction on Output: Example 1
    Limit maximum motor current
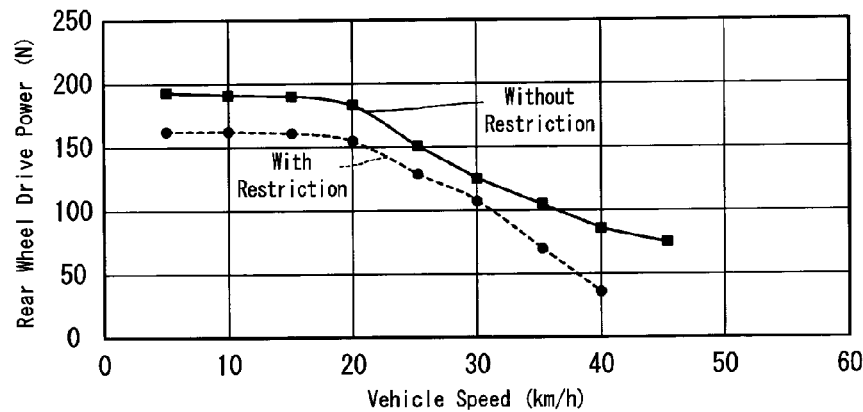
(b) Restriction on Output: Example 2
    Limit maximum motor output
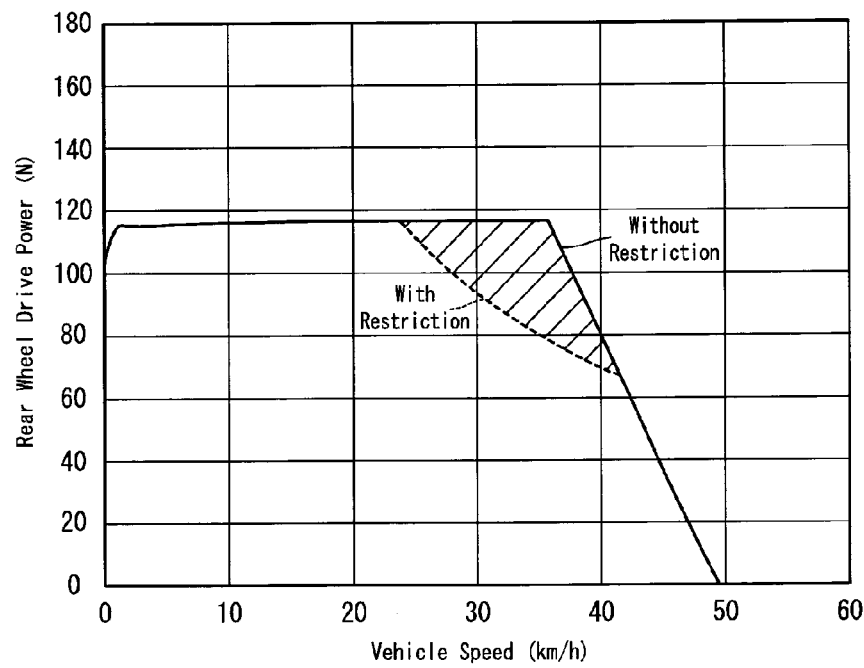

FIG. 23
(a)
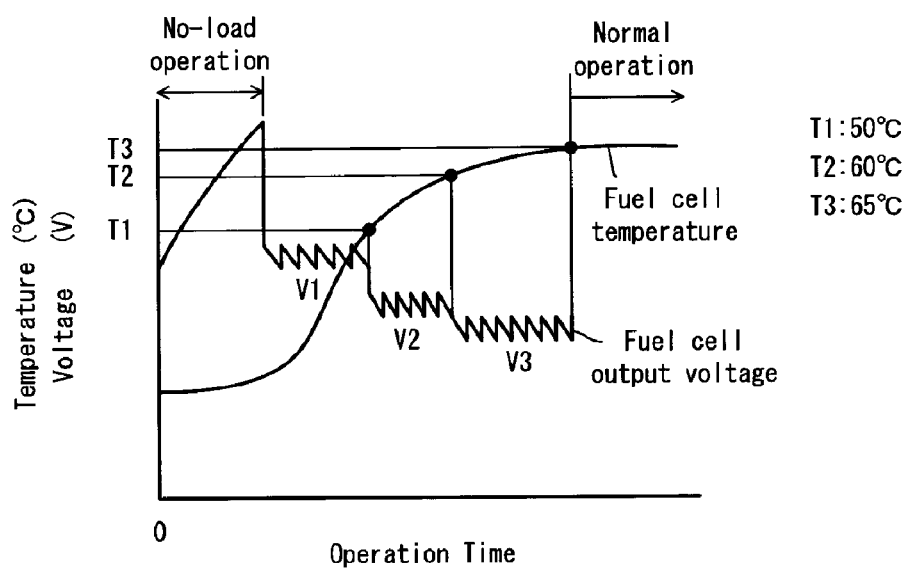
Normal Mode
T1: 50°C
T2: 60°C
T3: 65°C
(b)
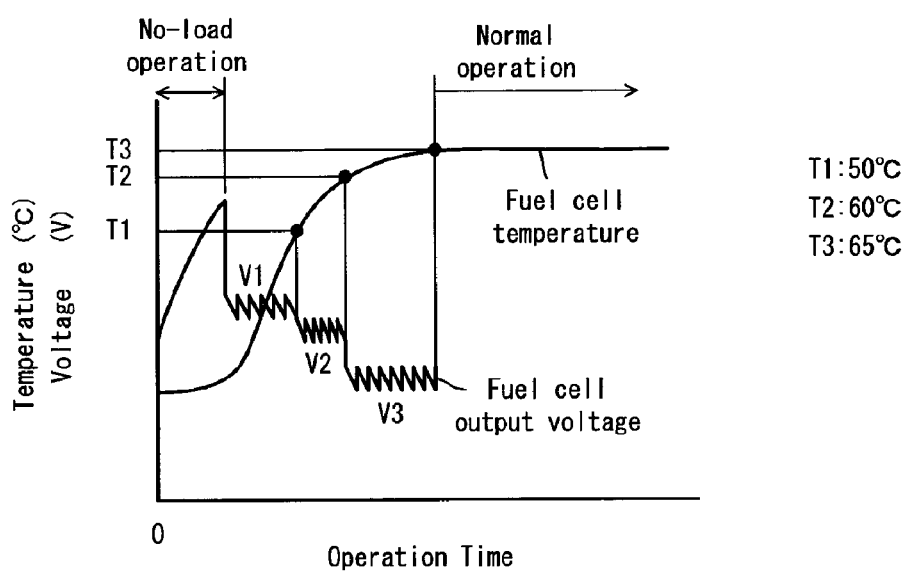
Low-Consumption Mode
T1: 50°C
T2: 60°C
T3: 65°C

FUEL CELL SYSTEM AND STARTING METHOD THEREFOR

BACKGROUND OF THE INVENTION

1. Field of the Invention

The present invention relates to fuel cell systems and driving methods therefore, and more specifically, to a fuel cell system including a secondary battery which is electrically connected with a fuel cell, and a method of starting the system.

2. Description of the Related Art

Fuel cells take time until they attain a temperature that is appropriate for power generation, after being started at an ambient temperature. While the temperature is low, the power generation output of the fuel cell is low. When starting, therefore, fuel cell systems obtain energy from power supplies other than the fuel cell in order to drive their system components, etc. Fuel cell systems cannot start themselves without an energy supply other than the fuel cell. Further, even if a fuel cell system has an energy supply such as a secondary battery, a problem will be encountered during a start-up of the fuel cell system if there is not sufficient supply of energy from the secondary battery until the fuel cell has attained a temperature appropriate for sufficient power generation.

A fuel cell system which includes a secondary battery is disclosed in JP-A 9-231991, for example. JP-A 9-231991 discloses a technique for supplying a load with electric power from a secondary battery when the system is started, during which the warming-up state of the fuel cell is monitored. When it is determined that the fuel cell is warmed up to a sufficient level, the fuel cell is connected with the load so that the fuel cell supplies electric power to the load.

However, the fuel cell system according to JP-A 9-231991 does not monitor the amount of energy stored in the secondary battery, and therefore can fail to start the fuel cell system if sufficient power is not stored in the secondary battery.

SUMMARY OF THE INVENTION

In order to overcome the problems described above, preferred embodiments of the present invention provide a fuel cell system and a starting method therefore, which prevent problems when the system is started.

According to a preferred embodiment of the present invention, a fuel cell system includes: a fuel cell; a secondary battery electrically connected with the fuel cell; a temperature detector arranged to detect a temperature of the fuel cell; and a first calculation unit arranged to calculate a threshold value which represents energy necessary for starting the fuel cell system based on the temperature of the fuel cell detected by the temperature detector. The threshold value is used for determining a start-up mode of the fuel cell system.

According to another preferred embodiment of the present invention, a method of starting a fuel cell system including a fuel cell and a secondary battery electrically connected with the fuel cell is provided. The fuel cell system is connected with a load. The method includes a first step of detecting a temperature of the fuel cell; and a second step of calculating a threshold value representing energy necessary for starting the fuel cell system, based on the detected temperature of the fuel cell. The threshold value is used for determining a start-up mode of the fuel cell system.

According to a preferred embodiment of the present invention, the threshold value representing energy necessary for starting the fuel cell system is calculated based on the temperature of the fuel cell. It is possible to select an optimum start-up mode in accordance with a state of fuel cell based on the threshold value obtained as described above and data concerning electric energy stored in the secondary battery, eliminating problems in starting the fuel cell system.

Preferably, a necessary time for the fuel cell to attain a target temperature is determined, based on the detected temperature of the fuel cell; and a first threshold value representing low-consumption energy necessary for starting the fuel cell system in a low consumption mode is calculated based on the necessary time and a low-consumption electric power necessary for starting the fuel cell system in the low consumption mode. The first threshold value is included in the threshold value and used for determining whether or not to start the fuel cell system. That is, whether or not to start the fuel cell system is determined, based on the data concerning electric energy stored in the secondary battery and the first threshold value. For example, in a case where the data concerning stored electric energy refers to the stored electric energy itself, and the first threshold value represents the very low-consumption energy, the fuel cell system is started if the electric energy stored in the secondary battery is not smaller than the first threshold value. On the other hand, if the electric energy stored in the secondary battery is smaller than the first threshold value, starting of the fuel cell system is stopped, based on a judgment that it is impossible to start the fuel cell system even in the low consumption mode. This makes it possible to avoid unnecessary consumption of energy.

Further preferably, a necessary time for the fuel cell to attain a target temperature is determined based on the detected temperature of the fuel cell; and a second threshold value representing normal-consumption energy necessary for starting the fuel cell system in a normal mode is calculated based on the necessary time and a normal electric power necessary for starting the fuel cell system in the normal mode. The second threshold value is included in the threshold value and used for determining whether or not the fuel cell system is started in the normal mode. That is, whether or not to start the fuel cell system in the normal mode is determined, based on the data concerning electric energy stored in the secondary battery and the second threshold value. For example, in a case where the data concerning stored electric energy refers to the very stored electric energy, and the second threshold value represents the normal-consumption energy itself which is necessary for starting the fuel cell system in the normal mode, the fuel cell system is started in the normal mode if the electric energy stored in the secondary battery is not smaller than the second threshold value. On the other hand, if the electric energy stored in the secondary battery is smaller than the second threshold value, the fuel cell system is started in the low consumption mode. In this way, the fuel cell system is started in a mode which is appropriate to the electric energy stored in the secondary battery.

Further preferably, a necessary time for the fuel cell to attain a target temperature is determined, based on the detected temperature of the fuel cell. And a third threshold value representing a sum of normal-consumption energy necessary for starting the fuel cell system in the normal mode and a load energy demand necessary for driving the load normally is calculated, based on the necessary time, the normal electric power necessary for starting the fuel cell system in the normal mode, and unit energy necessary for driving the load normally. The third threshold value is used for determining whether or not to drive the load normally. That is, whether or not to drive the load normally is determined based on the data concerning electric energy stored in the secondary battery and the third threshold value. For example, in a case where the data concerning the stored electric energy refers to the stored electric energy itself, and the third threshold value represents the exact sum of the normal-consumption energy and the load energy demand, the load is enabled for normal driving if the electric energy stored in the secondary battery is not lower than the third threshold value. On the other hand, if the electric energy stored in the secondary battery is smaller than the third threshold value, the load is enabled for a mode other than normal driving. As described, the load is enabled for driving within a range allowable by the electric energy stored in the secondary battery.

According to another preferred embodiment of the present invention, a fuel cell system connected with a load includes: a fuel cell; a secondary battery electrically connected with the fuel cell; a temperature detector arranged to detect a temperature of the fuel cell; and a determination unit arranged to determine one of a plurality of start-up modes differing from each other in energy consumption for the fuel cell system based on the temperature of the fuel cell detected by the temperature detector.

According to various preferred embodiments of the present invention, a start-up mode of a fuel cell system is determined based on the temperature of the fuel cell, and the fuel cell system is operated in accordance with the determined start-up mode. This makes it possible to select a start-up mode that is appropriate to the temperature of the fuel cell, and eliminate problems in starting the fuel cell system.

Preferred embodiments of the present invention can be used suitably in transportation equipment which requires that, if the fuel cell system is to be mounted, the capacity of the secondary battery be small. Specifically, preferred embodiments of the present invention can be used suitably in cases where at least one of the loads is a motor of the transportation equipment.

It should be noted here that the meaning of the term "data concerning stored electric energy" is not limited to the stored electric energy itself, but may mean a value which has a one-to-one relationship with the stored electric energy (e.g., a value convertible to and from the amount of stored electric energy) such as the amount of electric charge, voltage, current, etc.

The term "energy necessary for starting the fuel cell system" means energy necessary for a fuel cell system to start and attain a temperature (target temperature) at which the fuel cell can sufficiently perform power generation.

The meaning of the term "threshold value corresponding to the energy" is not limited to energy itself, but may mean a value which has a one-to-one relationship with the energy (e.g., a value convertible to and from the energy) such as the amount of electric charge, voltage, current, etc.

The term "normal mode" is a mode of operating a fuel cell system, where no restriction is placed on operations of system components, etc., when the fuel cell system is started.

The term "low consumption mode" is a mode of operating a fuel cell system, where restrictions are placed on operations of system components, etc., when the fuel cell system is started. Energy consumption is smaller than in the normal mode.

The term "load energy demand" means energy necessary for driving the load normally until a fuel cell attains a temperature (target temperature) at which the fuel cell can sufficiently perform power generation.

"Normal drive (or to drive normally)" means driving without restriction.

The above-described and other elements, steps, features, characteristics, aspects and advantages of the present invention will become clearer from the following detailed description of preferred embodiments to be made with reference to the attached drawings.

BRIEF DESCRIPTION OF THE DRAWINGS

FIG. 5($a$) is a graph showing time course changes of a fuel cell temperature after a fuel cell system is started; FIG. 5($b$) is a graph showing a relationship between a temperature of a fuel cell when a fuel cell system is started and a necessary time to attain a target temperature.

FIG. 8 is a graph for describing a case where the fuel cell system is started in a low consumption mode but a vehicle is not enabled for driving.

FIG. 9 is a graph for describing a case where the fuel cell system is started normally and the vehicle is enabled for restrictive driving.

FIG. 10 is a graph for describing a case where the fuel cell system is started normally and the vehicle is enabled for normal driving.

FIGS. 11($a$) and 11($b$) include graphs showing cases where a restriction is made on vehicle's output wherein FIG. 11($a$) shows a case where maximum motor current is limited; FIG. 11($b$) shows a case where maximum motor output is limited.

FIG. 23($a$) is a graph showing a fuel cell's temperature and output voltage with respect to operating time in a normal mode; FIG. 23($b$) is a graph showing the fuel cell's temperature and output voltage with respect to the operating time in a low consumption mode.

DETAILED DESCRIPTION OF PREFERRED EMBODIMENTS

Hereinafter, preferred embodiments of the present invention will be described with reference to the drawings.

Figure 1:
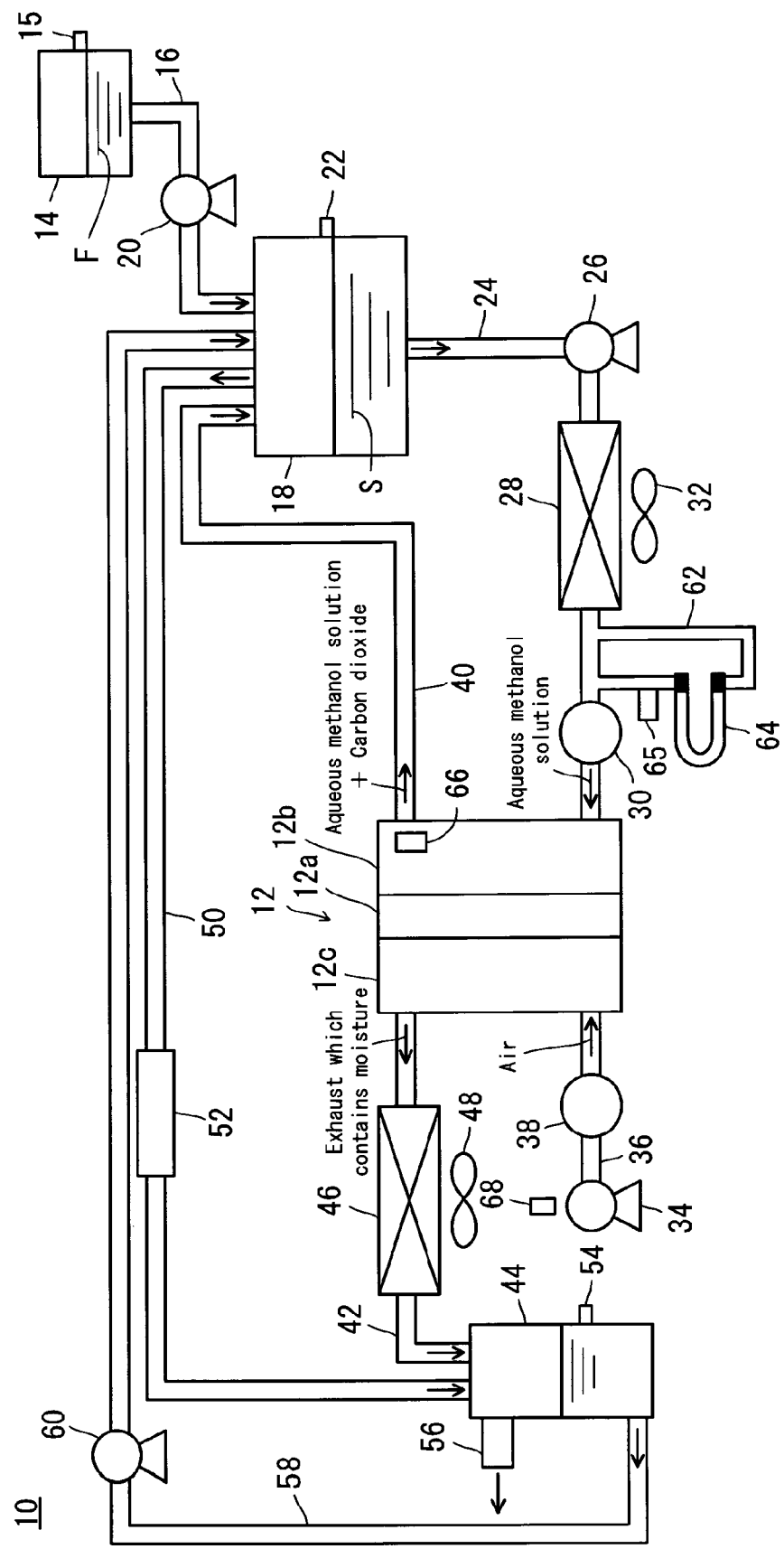
FIG. 1 is a schematic diagram showing a primary portion of a fuel cell system according to a preferred embodiment of the present invention.
Figure 2:
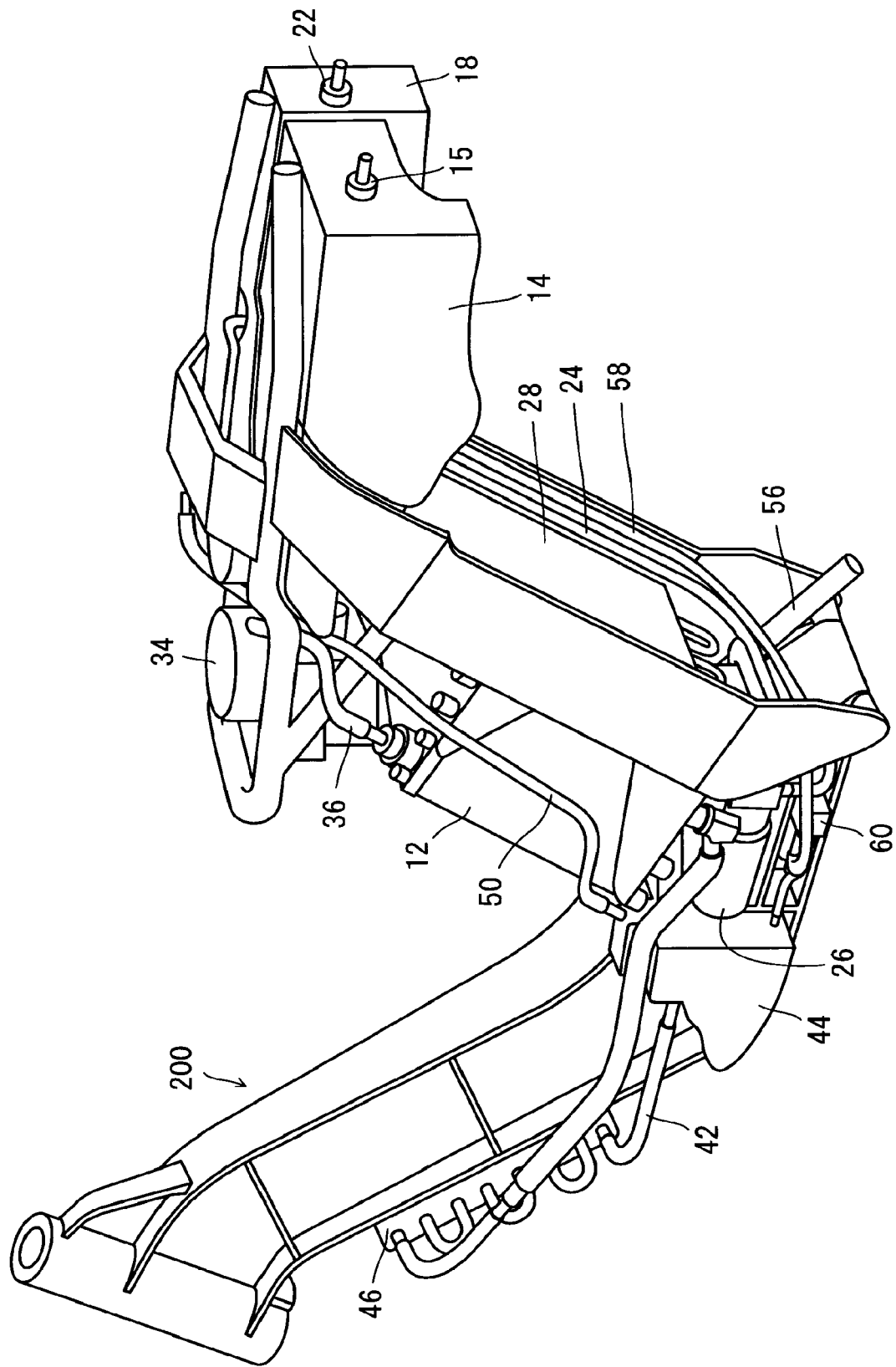
FIG. 2 is a perspective view showing a state where the fuel cell system is mounted on a frame of a motorbike.
Figure 3:
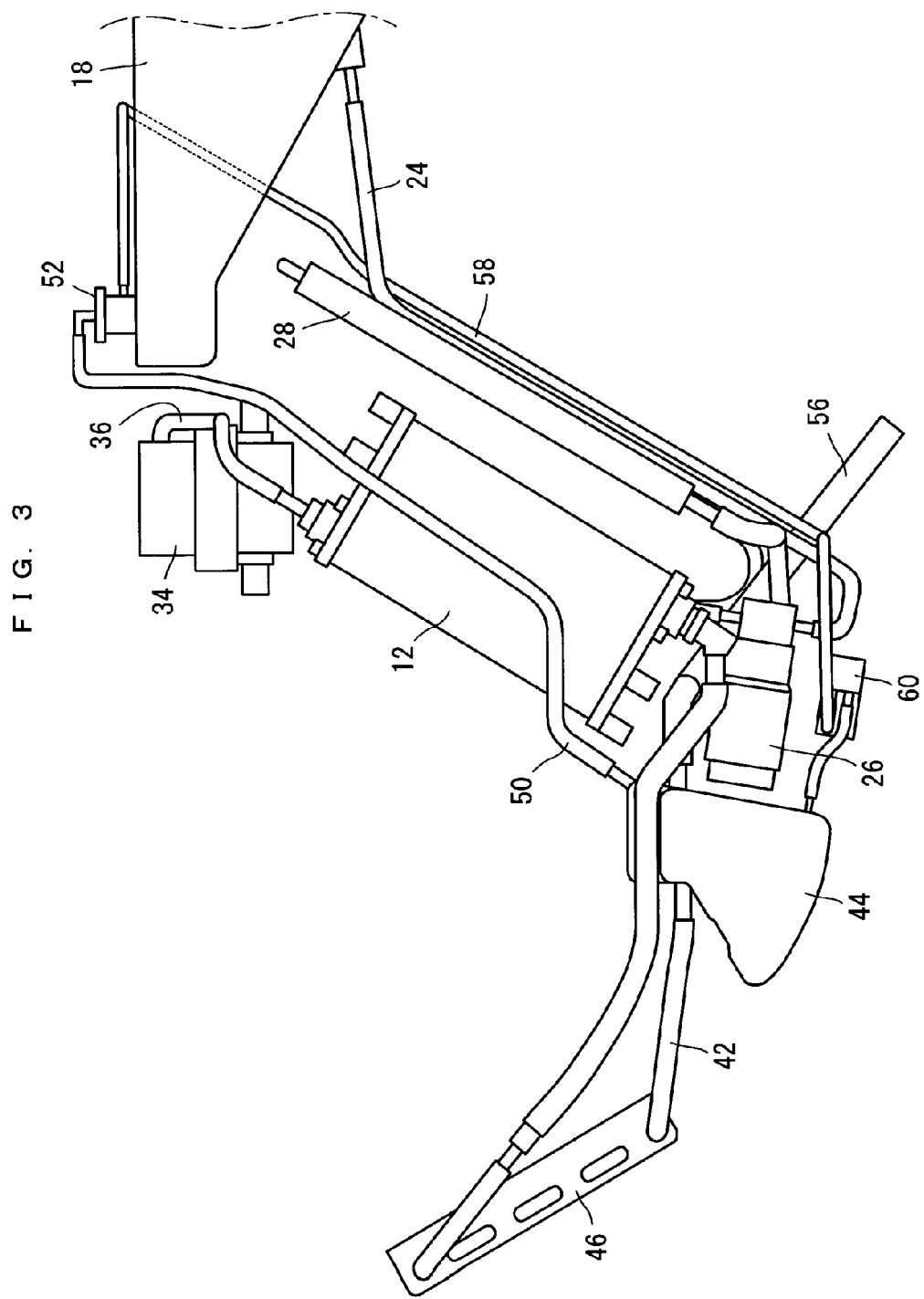
FIG. 3 is a schematic diagram showing a primary portion of the fuel cell system.

As shown in FIG. 1 through FIG. 4, a fuel cell system 10 according to a preferred embodiment of the present invention is provided as a direct methanol fuel cell system. Since direct methanol fuel cell systems do not need a reformer, the systems are used suitably for equipment which requires portability, and equipment in which size reduction is desirable. Herein, description will be made of a case where the fuel cell system 10 is used in a motorbike taken as an example of transportation equipment. It should be noted here that the motorbike will be shown only as a motorbike frame 200 as in FIG. 2. In FIG. 2, the left side is the front side of the vehicle and the right side is the rear side thereof. The fuel cell system 10 is disposed along the motorbike frame 200. Hereinafter, the motorbike may be referred to as a vehicle, as necessary.

Referring mainly to FIG. 1, the fuel cell system 10 includes a fuel cell 12. The fuel cell 12 is configured as a fuel cell stack constituted by a plurality of fuel cells connected (layered) in series. Each fuel cell includes an electrolyte 12a provided by a solid polymer film, as well as an anode (fuel electrode) 12b and a cathode (air electrode) 12c which sandwich the electrolyte 12a.

Also, the fuel cell system 10 includes a fuel tank 14 which stores highly concentrated methanol fuel (aqueous methanol solution containing methanol at approximately 50 wt %) F. The fuel tank 14 is connected with an aqueous solution tank 18 which stores aqueous methanol solution S, via a fuel supply pipe 16. The fuel supply pipe 16 is provided with a fuel pump 20, and as the fuel pump 20 is driven, methanol fuel F in the fuel tank 14 is supplied to the aqueous solution tank 18.

The fuel tank 14 is provided with a level sensor 15 arranged to detect a height of liquid surface of the methanol fuel F in the fuel tank 14. Likewise, the aqueous solution tank 18 is provided with a level sensor 22 arranged to detect a height of liquid surface of the aqueous methanol solution S in the aqueous solution tank 18. By detecting the height of liquid surfaces with the level sensors 15, 22, the amount of liquids in the tanks can be detected. The same applies to a level sensor 54 to be described later.

The aqueous solution tank 18 is connected with the anode 12b of the fuel cell 12 via an aqueous solution pipe 24. The aqueous solution pipe 24 is provided with an aqueous solution pump 26, a radiator 28 which functions as a heat exchanger, and an aqueous solution filter 30, in this order from the upstream side. A cooling fan 32 is disposed near the radiator 28 in order to cool the radiator 28. An aqueous methanol solution S in the aqueous solution tank 18 is pumped toward the anode 12b by the aqueous solution pump 26, cooled by the radiator 28 as necessary, and further, purified by the aqueous solution filter 30 and then supplied to the anode 12b.

On the other hand, the cathode 12c in the fuel cell 12 is connected with an air pump 34 via an air-side pipe 36. The air-side pipe 36 is provided with an air filter 38. Therefore, air from the air pump 34 which contains oxygen (oxidizer) is supplied to the cathode 12c after it is purified by the air filter 38.

Also, the anode 12b and the aqueous solution tank 18 are connected with each other via a pipe 40, through which the aqueous solution tank 18 receives unused aqueous methanol solution and produced carbon dioxide discharged from the anode 12b.

Further, the cathode 12c is connected with a water tank 44 via a pipe 42. The pipe 42 is provided with a radiator 46 which functions as a gas-liquid separator, and near the radiator 46 a cooling fan 48 for cooling the radiator 46 is disposed. The cathode 12c discharges an exhaust which contains moisture (water and water vapor). The exhaust is supplied to the water tank 44 via the pipe 42.

Also, the aqueous solution tank 18 and the water tank 44 are connected with each other via a $CO_2$ vent pipe 50. The $CO_2$ vent pipe 50 is provided with a methanol trap 52 for separating aqueous methanol solution S. With this arrangement, carbon dioxide discharged from the aqueous solution tank 18 is supplied to the water tank 44.

The water tank 44 is provided with a level sensor 54 arranged to detect a height of liquid in the water tank 44. Also, an exhaust gas pipe 56 is attached to the water tank 44. Through the exhaust gas pipe 56, carbon dioxide and exhaust from the cathode 12c are discharged.

The water tank 44 is connected with the aqueous solution tank 18 via a water returning pipe 58. The water returning pipe 58 is provided with a water pump 60. Water in the water tank 44 is returned to the aqueous solution tank 18 by driving the water pump 60, as necessary, depending on the situation in the aqueous solution tank 18.

Also, along the aqueous solution pipe 24, a bypass pipe 62 is provided between the radiator 28 and the aqueous solution filter 30.

Figure 4:
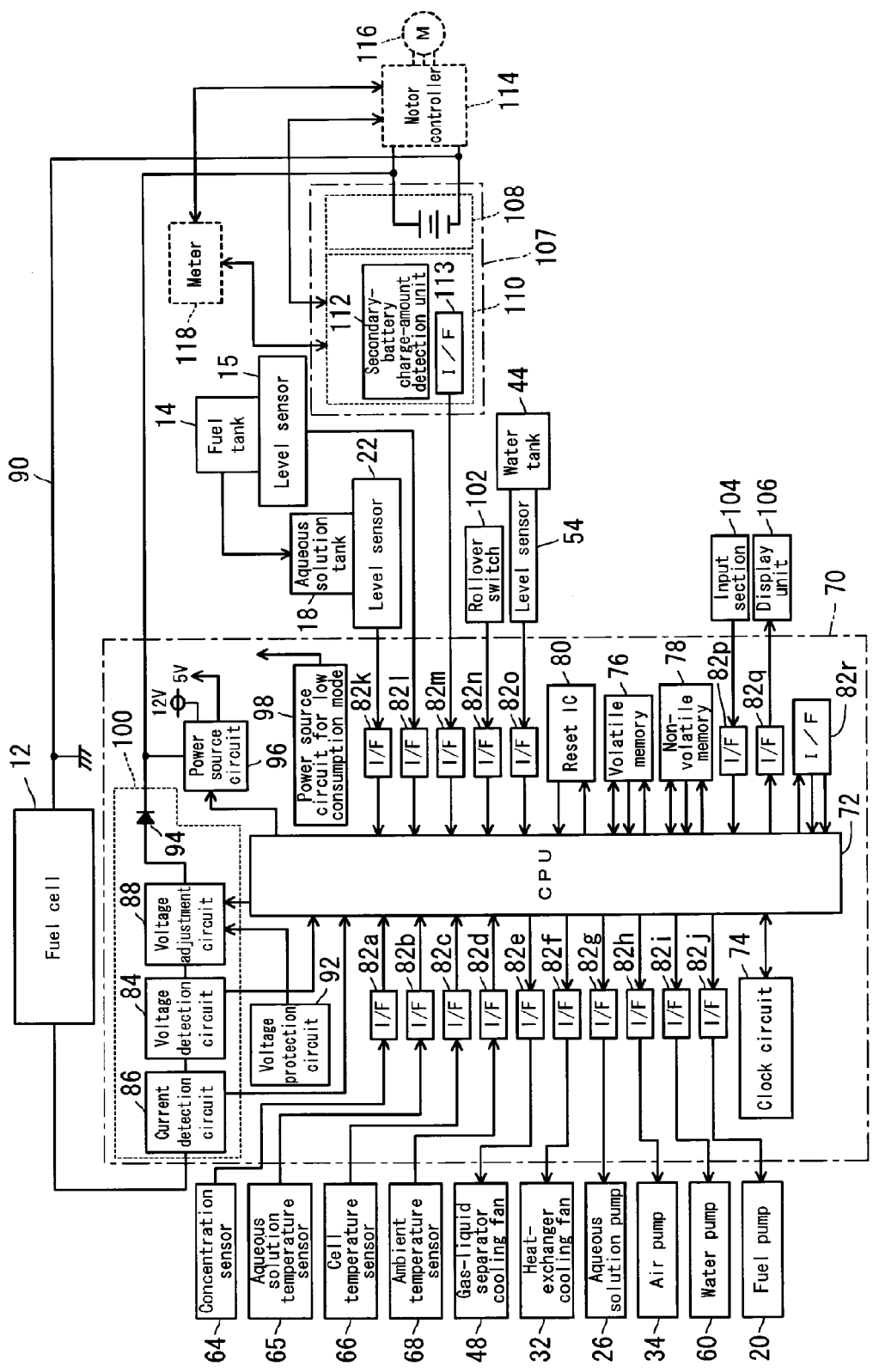
FIG. 4 is a block diagram showing an electric configuration of the fuel cell system.

Referring also to FIG. 4, further, in the fuel cell system 10, the bypass pipe 62 is provided with a concentration sensor 64 arranged to detect the concentration of aqueous methanol solution S, and an aqueous solution temperature sensor 65 arranged to detect the temperature of aqueous methanol solution S. The fuel cell 12 is provided with a cell temperature sensor 66 arranged to detect the temperature of fuel cell 12, and an ambient temperature sensor 68 arranged to detect the ambient temperature is provided near the air pump 34. It should be noted here that the cell temperature sensor 66 is preferably disposed at a location in the fuel cell 12 where the highest temperature will be observed, e.g. near an outlet of the aqueous methanol solution S.

As shown in FIG. 4, the fuel cell system 10 includes a control circuit 70.

The control circuit 70 preferably includes: a CPU 72 for performing necessary calculations and providing control over operations of the fuel cell system 10; a clock circuit 74 which provides the CPU 72 with clock signals; a volatile memory 76 including, e.g. a DRAM, for keeping elapsed time based on the clock signals provided to the CPU 72, flags, calculation data, etc; a non-volatile memory 78 including, e.g. an EPROM or an SRAM, for storing programs, data, etc., to control operations of the fuel cell system 10; a reset IC 80 for preventing erroneous operation of the fuel cell system 10; a plurality of interface circuits 82a through 82r for connection with external components; a voltage detection circuit 84 for detecting an output voltage of the fuel cell 12; a current detection circuit 86 for detecting an output electric current of the fuel cell 12; a voltage adjustment circuit 88 for adjusting the output voltage of the fuel cell 12; a voltage protection circuit 92 for protecting the electric circuit 90 from overvoltage; a diode 94 placed in the electric circuit 90 for protecting the fuel cell 12; a power source circuit 96 for providing the electric circuit 90 with a voltage for a normal mode; and a power source circuit 98 for providing the electric circuit 90 with a voltage for a low consumption mode. The fuel cell system 10 is configured as a series type system which supplies a load with electric power via a secondary battery 108 (to be described later).

The voltage detection circuit 84, the current detection circuit 86, the voltage adjustment circuit 88 and the diode 94 constitute a voltage control unit 100.

The CPU 72 of the control circuit 70 as described above is supplied with detection signals from the concentration sensor 64, the aqueous solution temperature sensor 65, the cell temperature sensor 66 and the ambient temperature sensor 68, via the interface circuits 82a, 82b, 82c and 82d respectively. In addition, the CPU 72 is supplied with detection signals from the level sensors 15, 22 and 54 via the interface circuits 82l, 82k and 82o respectively. Further, the CPU 72 is supplied with detection signals from a rollover switch 102 which detects rollover, via the interface circuit 82n, as well as signals from an input section 104 which is used for making various settings and information entry, via the interface circuit 82p.

Also, the CPU 72 sends control signals to the fuel pump 20, the aqueous solution pump 26, the air pump 34, the heat-exchanger cooling fan 32, the gas-liquid separator cooling fan 48 and the water pump 60 via the interface circuits 82j, 82g, 82h, 82f, 82e and 82i respectively. Hence the CPU 72 controls these system components. Also, the CPU 72 sends control signals to a display unit 106 via the interface circuit 82q, and controls the display unit 106 which is a unit for displaying a variety of information and providing the rider of the motorbike with a variety of information.

Also, the fuel cell 12 is connected with the secondary battery 108 placed in a battery box 107. The secondary battery 108 complements the output from the fuel cell 12, is charged with electric energy from the fuel cell 12, and discharges the electric energy to supply power to a motor 116 (to be described later) and system components. Particularly, when starting power generation, system components are driven by electric energy from the secondary battery 108, and as the amount of power generated by the fuel cell 12 increases, the electric energy is stored in the secondary battery 108. The secondary battery 108 is preferably a nickel hydride battery, a lithium ion battery, a Ni—Cd battery, etc. The secondary battery 108 is connected with a control device 110. The control device 110 is preferably constituted by a CPU, a memory, etc., and includes a secondary-battery charge-amount detection unit 112 which detects an amount of charge in the secondary battery 108, and can also detect a voltage, current, temperature, etc. of the secondary battery 108. In the present preferred embodiment, the amount of charge in the secondary battery 108 is obtained by multiplying the voltage of the secondary battery with a predetermined constant. However, the calculation may also include factors which reflect consideration into the electric current and the extent of battery deterioration. The control device 110 sends these pieces of information about the secondary battery 108 to the control circuit 70 via an interface circuit 113, and also to a motor controller 114 connected with the secondary battery 108. The motor controller 114 is connected to a load, i.e. a motor 116 of the motorbike, and the electric energy supplied to the motor 116 is controlled by the motor controller 114. The motor controller 114 is connected with a meter 118 arranged to measure various data of the motor 116. Information such as data measured by the meter 118, state of the motor 116, etc. is inputted to the CPU 72 via the interface circuit 113 of the control device 110 and the interface circuit 82m of the control circuit 70.

In this preferred embodiment, the volatile memory 76 stores such data as: the amount of charge in the secondary battery 108; electric energy stored in the secondary battery 108; detected temperatures of the fuel cell 12; a necessary time for the fuel cell 12 to attain a target temperature; a first threshold value for determining whether or not the fuel cell system 10 should be started; a second threshold value for determining whether the fuel cell system 10 should be started in normal mode or in low consumption mode; a third threshold value for determining whether or not the load may be driven normally; a load energy demand; etc.

The non-volatile memory 78 stores data such as: low-consumption electric power necessary for driving the fuel cell system 10 in low consumption mode for a unit of time; normal electric power necessary for driving the fuel cell system 10 in normal mode for a unit of time, a predetermined voltage for determining whether or not the fuel cell 12 should be brought to a no-load state; a vehicle average output which represents a specific unit of energy necessary for driving the load normally for a unit of time, etc. The non-volatile memory 78 also stores table data which indicates a relationship between the temperature of the fuel cell 12 when starting the fuel cell system 10 and a necessary time for attaining a target temperature (for example, approximately 65° C. in the present preferred embodiment). The necessary time is calculated on the basis of the temperature of the fuel cell 12 at the time of start-up, power generation efficiency and thermal capacity. For example, as shown in FIGS. 5(a) and 5(b), the higher the temperature of the fuel cell 12 at the time of system start-up, the shorter will be the necessary time to reach the target temperature. Once the temperature of the fuel cell 12 at the time of start-up is detected, a necessary time for the fuel cell 12 to attain the target temperature is estimated by making reference to the table data. In FIG. 5(a), fuel cell temperatures at the time point zero (on the vertical axis) each indicate the temperature at the time of start-up.

The non-volatile memory 78 also stores control information (control parameters, programs, etc.) for a plurality of start-up modes of different energy consumption.

In the present preferred embodiment, the CPU 72 preferably defines the first calculation unit, the second calculation unit and the determination unit, whereas the volatile memory 76 and the non-volatile memory 78 define the memory.

Figure 6:
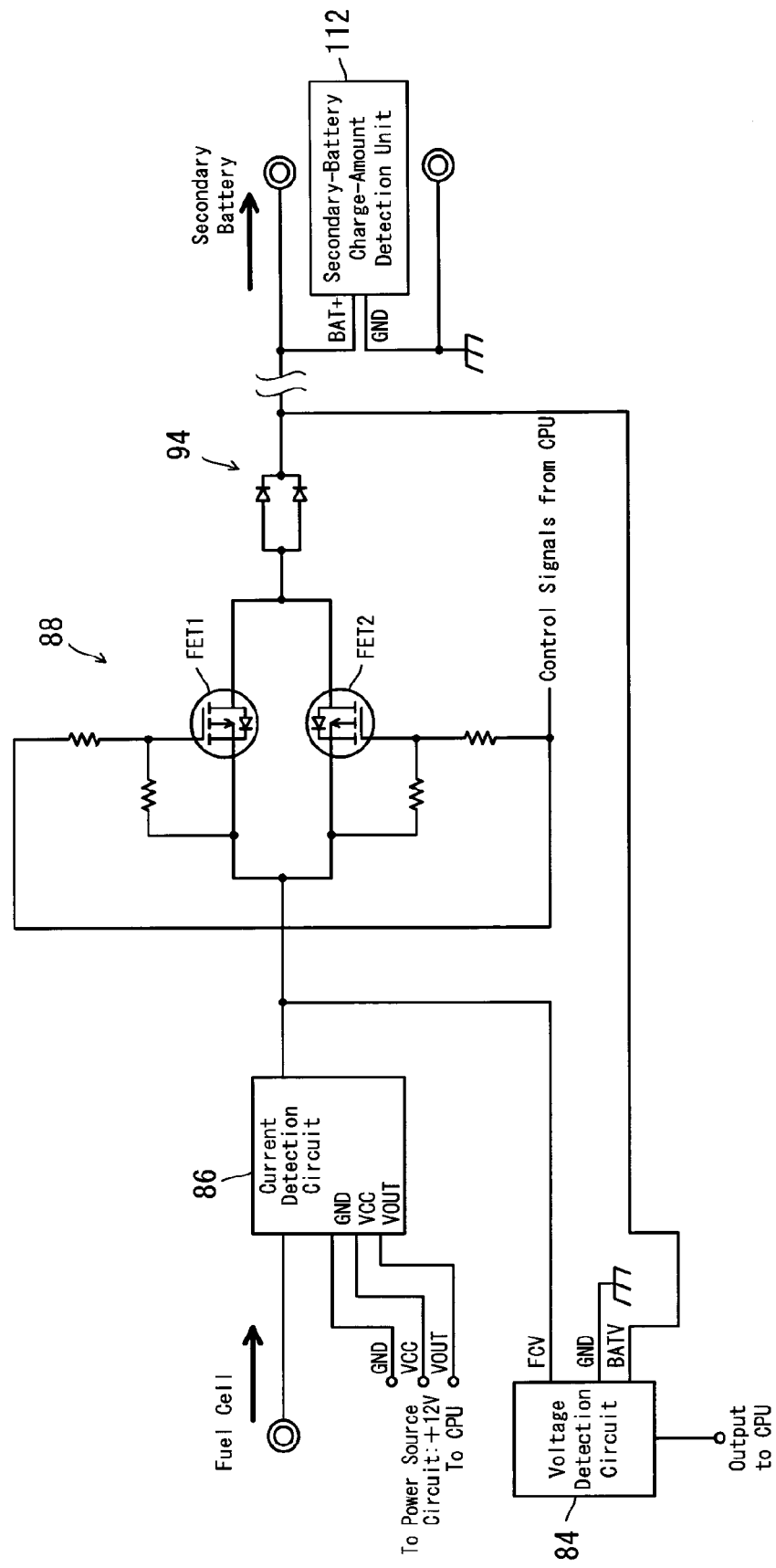
FIG. 6 is a circuit diagram showing a voltage control unit.

Reference will be made here to FIG. 6, to describe the voltage control unit 100.

The current detection circuit 86, provided by a current transformer, for example, detects an output current from the fuel cell 12. The current detected by the current detection circuit 86 is converted into a voltage and is supplied to the CPU 72. The current detection circuit 86 is connected, on its output side, with a voltage detection circuit 84 which detects an output voltage of the fuel cell 12. The detected output voltage of the fuel cell 12 is supplied to the CPU 72. The voltage detection circuit 84 also detects a voltage of the secondary battery 108. Further, the voltage detection circuit 84 is provided, on its output side, with a voltage adjustment circuit 88 which includes an FET1 and an FET2. The CPU 72 supplies control signals to the gate in each of the FET1 and the FET2, and the output voltage of the fuel cell 12 is adjusted on the basis of the control signals. Further, the voltage adjustment circuit 88 is connected, on its output side, with the diode 94 for protecting the fuel cell 12.

The voltage control unit 100 which has the configuration as described is connected, on its output side, with the secondary-battery charge-amount detection unit 112. The secondary-battery charge-amount detection unit 112 detects the amount of charge in the secondary battery 108.

A power generation operation by the fuel cell system 10 as the above will be outlined. As an unillustrated main switch is turned on, the fuel cell system 10 drives its system components such as the aqueous solution pump 26 and the air pump 34, thereby starting the power generation (operation).

When starting the power generation, the aqueous solution pump 26 is driven, whereby aqueous methanol solution S of a desired concentration stored in the aqueous solution tank 18 is pumped toward the fuel cell 12, cooled by the radiator 28 as necessary, purified by the aqueous solution filter 30, and then supplied to the anode 12b. On the other hand, air which contains oxygen serving as an oxidizer is pumped by the air pump 34 toward the fuel cell 12, purified by the air filter 38, and then supplied to the cathode 12c.

At the anode 12b in the fuel cell 12, methanol and water in the aqueous methanol solution S react electrochemically with each other to produce carbon dioxide and hydrogen ions. The produced hydrogen ions flow through the electrolyte 12a, to the cathode 12c. The hydrogen ions react electrochemically with oxygen in the air supplied to the cathode 12c, to produce water (water vapor) and electric energy.

Carbon dioxide produced at the anode 12b in the fuel cell 12 flows through the pipe 40, the aqueous solution tank 18 and the $CO_2$ vent pipe 50, to the water tank 44, and then discharged from the exhaust gas pipe 56.

Meanwhile, most of the water vapor produced on the cathode 12c in the fuel cell 12 is liquefied and discharged in the form of water, with saturated water vapor being discharged in the form of gas. Part of the water vapor which was discharged from the cathode 12c is cooled and liquefied as its temperature decreases to or below the dew point in the radiator 46. Liquefaction of the water vapor by the radiator 46 is accelerated by operation of the cooling fan 48. Water (liquid water and water vapor) from the cathode 12c and unused air are supplied to the water tank 44 via the pipe 42. Also, water which moved to the cathode 12c due to water crossover is discharged from the cathode 12c, and supplied to the water tank 44. Further, water and carbon dioxide which are produced at the cathode 12c from methanol crossover are discharged from the cathode 12c, and supplied to the water tank 44.

It should be noted here that water crossover is a phenomenon in which a few mols of water moves to the cathode 12c, accompanying the hydrogen ions which are produced at the anode 12b and are moving to the cathode 12c. Methanol crossover is a phenomenon in which methanol moves to the cathode 12c, accompanying the hydrogen ions which move to the cathode 12c. At the cathode 12c, methanol reacts with air supplied from the air pump 34, and thereby decomposes into water and carbon dioxide.

Water (liquid) which was collected in the water tank 44 is returned as appropriately by the water pump 60, through the water returning pipe 58, to the aqueous solution tank 18, where the water is used for the methanol aqueous solution S.

Figure 7:
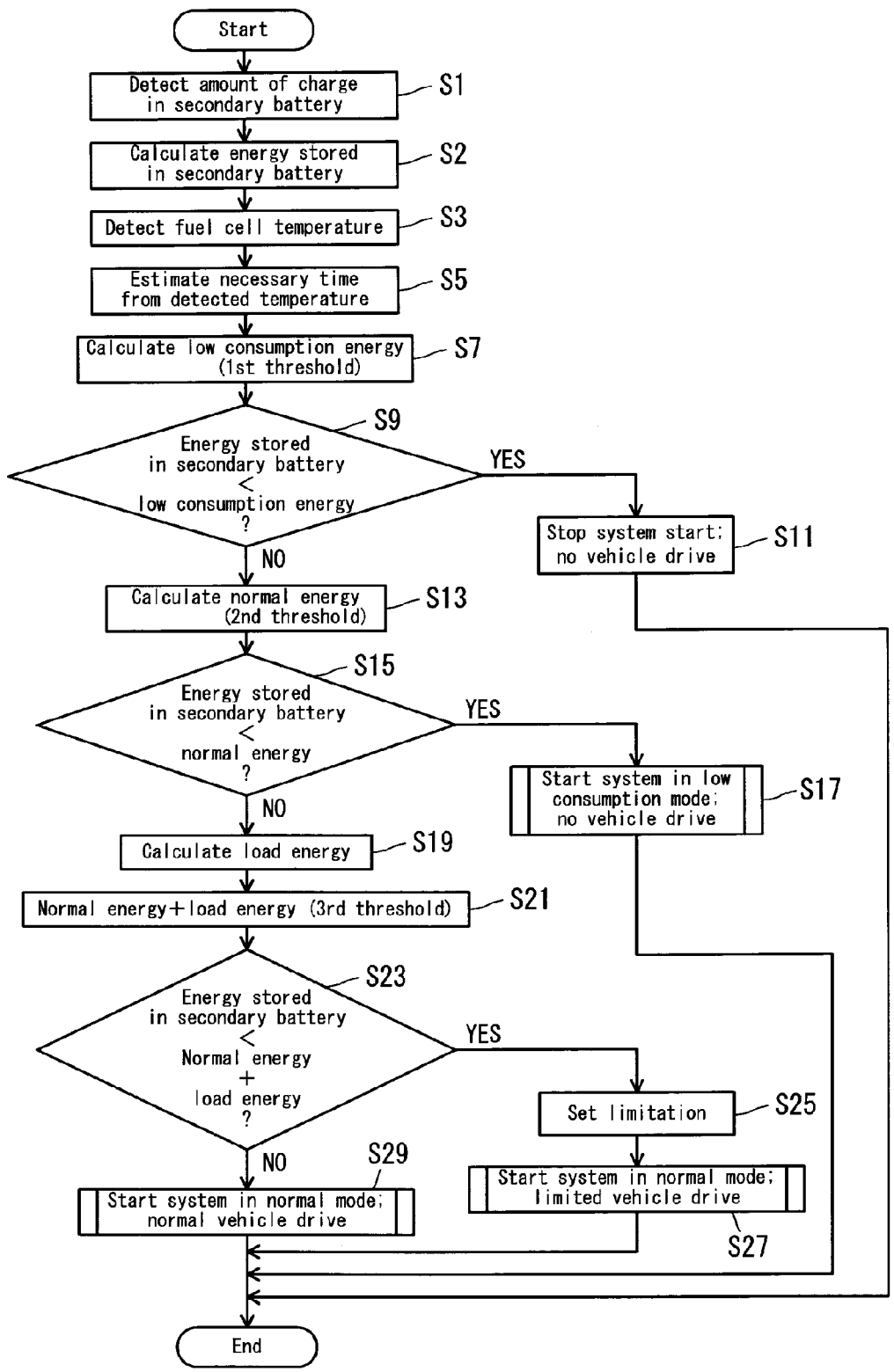
FIG. 7 is a flowchart showing an example of main operation performed when the fuel cell system is started.

Next, with reference to FIG. 7, description will be made for an example of main operation in the fuel cell system 10 at a time of start up. In the present preferred embodiment, the fuel cell system 10 preferably has three start-up modes, a normal mode, a low consumption mode and no start-up. Energy consumed in each mode is different.

First, as an unillustrated main switch is turned ON, an amount of charge (remaining capacity) in the secondary battery 108 is detected and stored in the volatile memory 76 (Step S1). The secondary-battery charge-amount detection unit 112 in the control device 110 detects a voltage of the secondary battery, and by multiplying the secondary-battery voltage with a predetermined constant, the amount of charge in the secondary battery 108 is obtained. The CPU 72 multiplies the obtained amount of charge in the secondary battery 108 with a predetermined voltage, to calculate electric energy stored in the secondary battery 108 (amount of charge×voltage=stored electric energy) (Step S2), and the value is stored in the volatile memory 76. In the present preferred embodiment, a device for obtaining the stored electric energy includes the secondary-battery charge-amount detection unit 112 and the CPU 72. It should be noted here that the amount of charge in the secondary battery 108 may be obtained on the basis of the voltage of the secondary battery detected by the voltage detection circuit 84.

Then, the cell temperature sensor 66 detects a temperature of the fuel cell 12 (Step S3). It should be noted here that the temperature of the fuel cell 12 refers to as a temperature which corresponds to the output of the fuel cell 12; and as a substitution to the temperature of the fuel cell 12, the system may use the temperature of aqueous methanol solution S in the aqueous solution tank 18 which has a high thermal capacity, or the temperature of exhaust from the cathode 12c, etc.

Next, reference is made to the table data which is stored in the non-volatile memory 78. The table data indicates a relationship between the temperature of the fuel cell 12 at a time of start-up and necessary time to attain a target temperature. Based on the detected temperature of the fuel cell 12, a necessary amount of time for attaining the target temperature is estimated (Step S5).

The estimated necessary time is multiplied by power consumption which is required for driving the fuel cell system 10 in low consumption mode for a unit of time (low-consumption electric power), whereby low-consumption energy which is used as a first threshold value is calculated (necessary time×low-consumption electric power=low-consumption energy) (Step S7). In the present preferred embodiment, the low-consumption electric power is approximately 70 W, for example, and most of it is consumed by the air pump 34 and a headlight of the vehicle.

Then, the system checks on whether or not the electric energy stored in the secondary battery 108 is smaller than the low-consumption energy (the first threshold value) (Step S9). If the electric energy stored in the secondary battery 108 is smaller than the low-consumption energy, the system determines that the start-up is impossible, stops starting the fuel cell system 10, and disables the vehicle (Step S11).

On the other hand, if Step S9 determines that the electric energy stored in the secondary battery 108 is not smaller than the low-consumption energy, the system determines that the start-up is possible, and calculates normal-consumption energy which is used as a second threshold value (Step S13). The normal-consumption energy is calculated by multiplying the estimated necessary time by normal electric power which is required for driving the fuel cell system 10 in normal mode for a unit of time (necessary time×normal electric power=normal-consumption energy).

Then, the system checks on whether or not the electric energy stored in the secondary battery 108 is smaller than the normal-consumption energy (the second threshold value) (Step S15). If the electric energy stored in the secondary battery 108 is smaller than the normal-consumption energy, the system determines that it is impossible to start in the normal mode, and thus the system starts the fuel cell system 10 in the low consumption mode. However, driving of the vehicle is disabled (Step S17). As described, the fuel cell system 10 can be started even if the electric energy stored in the secondary battery 108 is not very large.

On the other hand, if Step S15 determines that the electric energy stored in the secondary battery 108 is not smaller than the normal-consumption energy, the system determines that a start-up in the normal mode is possible, and the process goes to Step S19.

In Step S19, the vehicle's average output (approximately 800 W, for example) in normal operation, which is represented by the unit amount of energy stored in the non-volatile memory 78, is multiplied by the necessary time to the target temperature, to obtain a load energy demand (vehicle average output×necessary time=load energy demand). The load energy demand and the normal-consumption energy are added to each other, to be used as a third threshold value (Step S21).

Then, the system checks on whether or not the electric energy stored in the secondary battery 108 is smaller than the sum of the load energy demand and the normal-consumption energy (the third threshold value) (Step S23). If the electric energy stored in the secondary battery 108 is smaller, a restriction will be placed on vehicle driving, and the system sets the amount of the restriction (Step S25). In the present preferred embodiment, the restriction is preferably placed on driving of the vehicle rear wheel. The restriction may be made in steps, for example, with the amounts of restriction predetermined, and the setting being made to an amount appropriate to the electric energy stored in the secondary battery 108. Then, the fuel cell system 10 is started in the normal mode, and the vehicle is enabled for driving under a restrictive condition (Step S27).

On the other hand, if Step S23 determines that the electric energy stored in the secondary battery 108 is not smaller than the sum of the load energy demand and the normal-consumption energy, the fuel cell system 10 is started in the normal mode, and the vehicle is enabled for normal driving, so that the vehicle can be driven normally (Step S29).

It should be noted here that in the operation described above, the start-up mode of the fuel cell system 10 and vehicle driving status may be displayed in the display unit 106.

Now, reference will be made to FIGS. 8(*a*) and 8(*b*) to describe a case where the fuel cell system 10 is started in the low consumption mode but the vehicle is disabled.

If the electric energy stored in the secondary battery 108 has an initial value as shown in FIG. 8(*a*), starting the fuel cell system 10 in the normal mode will result in a time course as indicated by in Broken Line A1. More specifically, the electric energy stored in the secondary battery 108 will be zero during the start-up, becoming unable to continue the start-up process of fuel cell system 10 even if the vehicle is not driven. In this case therefore, the fuel cell system 10 is started not in the normal mode but in the low consumption mode where power generation is started with special limitations placed on the power consumed by the system components. Then, the electric energy stored in the secondary battery 108 will be as shown in Solid Line B1. It should be noted here that the limitations on the power consumed by the system components will be implemented by reducing the necessary time to attain the target temperature and limiting operation of the system components for example.

In FIG. 8(*b*), Broken Line A2 shows the output of the fuel cell 12 when the system is started in normal mode, Solid Line B2 shows the output of the fuel cell 12 when the system is started in low consumption mode, Broken Line A3 shows the power consumption by the fuel cell system 10 when the system is started in normal mode, Solid Line B3 shows the power consumption by the fuel cell system 10 when the system is started in the low consumption mode, and Solid Line B4 shows vehicle's average output when it is not driven.

As will be understood from Broken Line A2 and Solid Line B2, the low consumption mode will require a long time before the output of the fuel cell 12 reaches the normal level. Also, with reference to Broken Line A3 and Solid Line B3, the start-up in normal mode will require a power consumption of approximately 150 W by the system components whereas the start-up in low consumption mode will decrease the power consumption by the system components to approximately 100 W, making it possible to reduce energy consumption.

Next, reference will be made to FIGS. 9(*a*) and 9(*b*) to describe a case where the fuel cell system 10 is started in the normal mode and the vehicle is enabled for restrictive driving.

If the electric energy stored in the secondary battery 108 has an initial value as shown in FIG. 9(*a*), starting the fuel cell system 10 in the normal mode will result in a time course as indicated by Broken Line C1. More specifically, since the electric energy stored in the secondary battery 108 is small, the electric energy stored in the secondary battery 108 will be zero during the start-up, and it will become unable to continue the start-up process of fuel cell system 10. In this case therefore, the fuel cell system 10 is started in the normal mode but vehicle driving is restricted. Then, the electric energy stored in the secondary battery 108 will be as shown in Solid Line D1.

In FIG. 9(*b*), Solid Line D2 shows the output of the fuel cell 12 when the system is started in normal mode, Solid Line D3 shows the power consumption by the fuel cell system 10 when the system is started in normal mode, Solid Line D4 shows a vehicle's average output when the vehicle is driven under a restricted condition, and Broken Line C4 shows the vehicle's average output when it is driven normally. In this example, the vehicle's average output is restricted from a state indicated by Broken Line C4 to a state indicated by Solid Line D4.

Now, reference will be made to FIGS. 10(*a*) and 10(*b*) to describe a case where the fuel cell system 10 is started in normal mode and the vehicle is enabled for normal driving.

If the electric energy stored in the secondary battery 108 has an initial value as shown in FIG. 10(*a*), the fuel cell system 10 is started in normal mode and the vehicle is enabled for normal driving. Then, as shown in Solid Line E1, the electric energy stored in the secondary battery 108 will decrease due to energy consumption by the system components of the fuel cell system 10 and by the vehicle until a certain time point t is reached. After the time point t, the output from the fuel cell 12 stabilizes at a level not lower than the amount of energy consumed by the system components and the vehicle, where there is no longer energy deficit from the secondary battery 108, thus the system components and the vehicle are driven by the output from the fuel cell 12, and the secondary battery 108 starts to be charged. In this case, the secondary battery 12 has a surplus in its stored electric energy, and it is possible to start the system in the normal mode and to drive the vehicle normally.

In FIG. 10(*b*), Solid Line E2 shows the output of the fuel cell 12 when the system is started in normal mode, Solid Line E3 shows the power consumption by the fuel cell system 10 when the system is started in normal mode, and Solid Line E4 shows a vehicle's average output when the vehicle is driven normally.

It should be noted here that the vehicle's output will fluctuate in actual situations since the vehicle will be moving or stopping at different times. FIG. 8(*b*), FIG. 9(*b*) and FIG. 10(*b*) show the vehicle's average outputs.

Next, FIG. 11 shows an example where a restriction is placed on the vehicle's output.

FIG. 11(*a*) shows an example where the vehicle's output is restricted by limiting a maximum current of the motor 116. From FIG. 11(*a*), it is clear that limiting a maximum current of the motor 116 reduces drive power of the rear wheel, making it possible to reduce energy consumption.

FIG. 11(b) shows an example where the vehicle's output is restricted by limiting a maximum output of the motor 116. It is clear that limiting a maximum output of the motor 116 reduces drive power of the rear wheel as indicated by hatching in FIG. 11(b), making it possible to reduce energy consumption.

Figure 12:
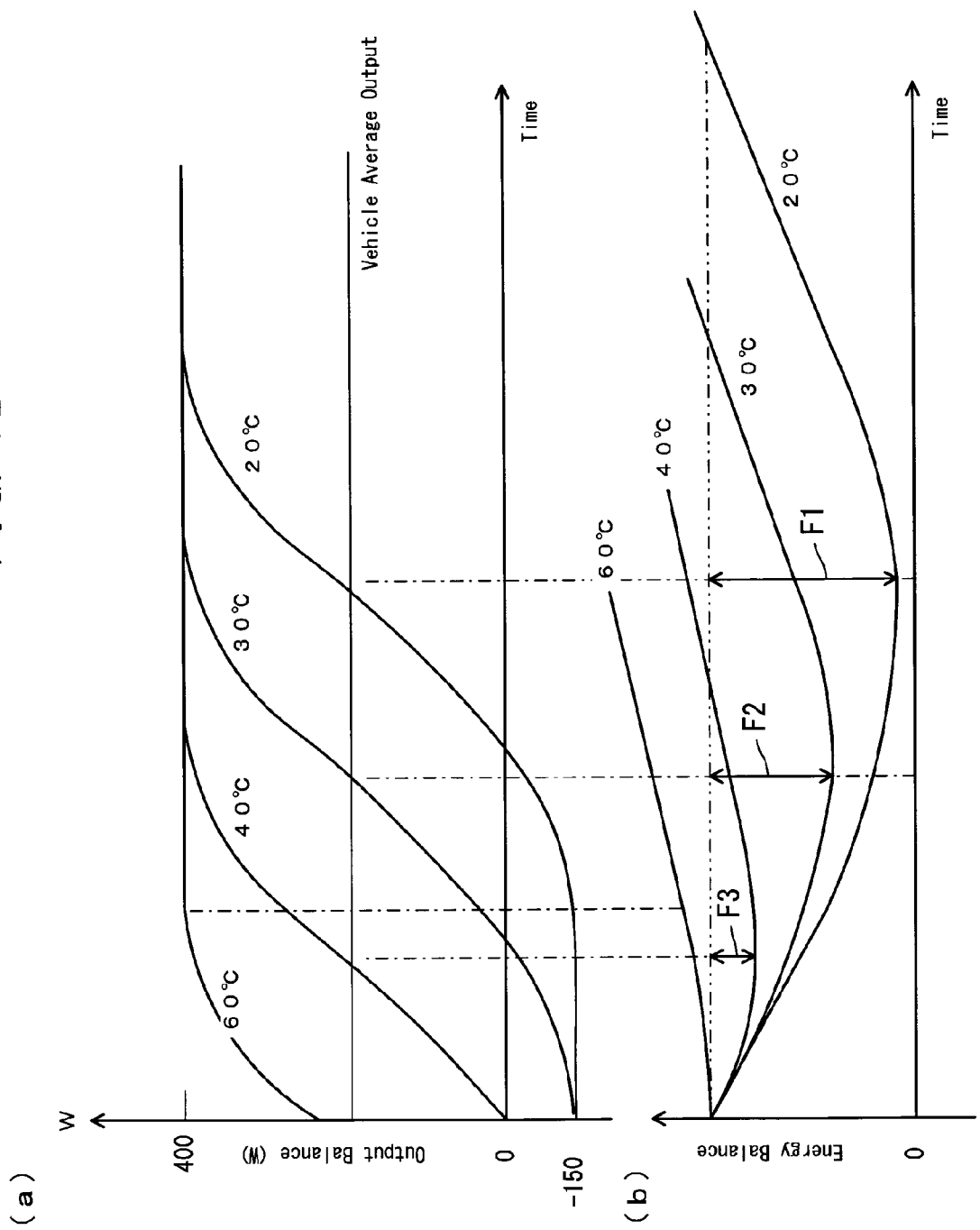
FIG. 12 is a graph showing that stored electric energy necessary in a secondary battery varies depending upon the temperature at a time when the fuel cell system is started.

Also, as understood from FIG. 12, the amount of electric energy which must be stored in the secondary battery 12 depends upon the temperature at the time of starting the fuel cell 12. Specifically, if the temperature at the time of start-up is 20° C., stored electric energy F1 is necessary. At 30° C., stored electric energy F2 is necessary, and at 40° C., stored electric energy F3 is necessary. In essence, the amount of stored electric energy required in the secondary battery 108 is smaller if the temperature at the time of start-up is higher. It should be noted here that the amounts of stored electric energy F1 through F3 each represent stored electric energy which is necessary for starting the fuel cell system 10 in the normal mode, with the vehicle enabled for normal driving.

Next, with reference to FIG. 13, description will be made for a subroutine in Step S17, FIG. 7, i.e. an operation in the case where the fuel cell system 10 is started in low consumption mode but the vehicle is disabled.

The fuel cell system 10 is started in the low consumption mode, power generation is started (Step S51), and the process then moves to normal operation (Step S53).

On the other hand, the vehicle, i.e. the load, is disabled at first (Step S55). Specifically, no voltage is applied to the motor 116, thus the motor 116 is not drivable, and this state is maintained until Step S57 determines that the electric energy stored in the secondary battery 108 is not lower than the normal-consumption energy (the second threshold value). In other words, only a charging operation of the secondary battery 108 is performed until the secondary battery 108 has been charged to a certain extent. Once the electric energy stored in the secondary battery 108 is not lower than the normal-consumption energy, the vehicle is enabled for driving under a restricted condition (for example, with a limit on a maximum current of the motor 116) (Step S59). This condition for driving the vehicle is maintained until Step S61 determines that a new calculation of the electric energy stored in the secondary battery 108 is not lower than the sum (the third threshold value) of the normal-consumption energy and the load energy demand. When the electric energy stored in the secondary battery 108 is not lower than the sum of the normal-consumption energy and the load energy demand, the restriction is removed, and the vehicle is enabled for normal driving (Step S63).

As described, once the electric energy stored in the secondary battery 108 is not lower than the third threshold value, the load is switched to normal driving. With this arrangement, it is possible to drive the load in a mode appropriate to the electric energy stored in the secondary battery 108.

Next, with reference to FIG. 14, description will be made for a subroutine in Step S27, FIG. 7, i.e. an operation in the case where the fuel cell system 10 is started in the normal mode and the vehicle is enabled for restrictive driving.

As for the fuel cell system 10, first, the level sensor 54 detects the amount of liquid (amount of water) in the water tank 44 (Step S101). If the amount of liquid detected in Step S101 is not smaller than a first predetermined amount (250 cc for example) which is a value set in advance (Step S103: YES), the water pump 60 is driven by the power from the secondary battery 108, to return water from the water tank 54 through the water returning pipe 58, to the aqueous solution tank 18 (Step S105). Thereafter, when the amount of liquid detected by the level sensor 54 is not greater than a second predetermined amount (approximately 220 cc, for example) which is a value set in advance (Step S107: YES), the water pump 60 is stopped (Step S109).

Also, even if the amount of liquid detected by the level sensor 54 is greater than the second predetermined amount in Step S107 (Step S107: NO), the process goes to Step S109 after a lapse of a predetermined amount of time (Step S111: YES). As described, the water pump 60 is stopped after a lapse of a predetermined amount of time, eliminating a problem that the second predetermined amount is never detected and power generation is never started due to a malfunction in the level sensor 54 for example. The operation in Step S105 is continued until the predetermined amount of time has lapsed (Step S111: NO).

After Step S109, system components such as the fuel pump 20, the aqueous solution pump 26, the air pump 34, the heat-exchanger cooling fan 32, the gas-liquid separator cooling fan 48 and the water pump 60 are driven, and power generation in the normal mode is started (Step S113). If Step S103 determines that the amount of liquid in the water tank 44 is smaller than the first predetermined amount (Step S103: NO), the process goes to Step S113. As described, normal operation is allowed (Step S115) after power generation in the normal mode is started.

On the other hand, the vehicle, i.e. the load, is enabled for restrictive driving (for example, with a limit on a maximum current of the motor 116) at first (Step S117). This condition for driving the vehicle is maintained until Step S119 determines that a new calculation of the electric energy stored in the secondary battery 108 gives a value not lower than the sum (the third threshold value) of the normal-consumption energy and the load energy demand. When the electric energy stored in the secondary battery 108 is not lower than the sum of the normal-consumption energy and the load energy demand, the vehicle is enabled for normal driving (Step S121).

Further, reference will be made to FIG. 15 to describe a subroutine in Step S29, FIG. 7, i.e. an operation in the case where the fuel cell system 10 is started in normal mode and the vehicle is enabled for normal driving.

As for the fuel cell system 10, first, the level sensor 54 detects the amount of liquid (amount of water) in the water tank 44 (Step S151). If the amount of liquid detected in Step S151 is not smaller than the first predetermined amount (250 cc for example) which is a value set in advance (Step S153: YES), the water pump 60 is driven by the power from the secondary battery 108, to return water from the water tank 54 through the water returning pipe 58 into the aqueous solution tank 18 (Step S155). Thereafter, when the amount of liquid detected by the level sensor 54 is not greater than the second predetermined amount (220 cc for example) which is a value set in advance (Step S157: YES), the water pump 60 is stopped (Step S159).

Also, even if the amount of liquid detected by the level sensor 54 is greater than the second predetermined amount in Step S157 (Step S157: NO), the process goes to Step S159 after a lapse of a predetermined amount of time (a minute for example) (Step S161: YES). As described, the water pump 60 is stopped after a lapse of a predetermined amount of time, eliminating a problem that the second predetermined amount is never detected and power generation is never started due to a malfunction in the level sensor 54, for example. The operation in Step S155 is continued until the predetermined amount of time has lapsed (Step S161: NO).

After Step S159, system components such as the fuel pump 20, the aqueous solution pump 26, the air pump 34, the heat-exchanger cooling fan 32, the gas-liquid separator cooling fan 48 and the water pump 60 are driven, and power generation in the normal mode is started (Step S163). If Step S153 determines that the amount of liquid in the water tank 44 is smaller than the first predetermined amount (Step S153: NO), the process goes to Step S163. As described, normal operation is allowed (Step S165) after power generation in the normal mode is started.

On the other hand, no limitation is set on the output of the vehicle, i.e. the load, and normal driving is allowed from the first place (Step S167).

Figure 13:
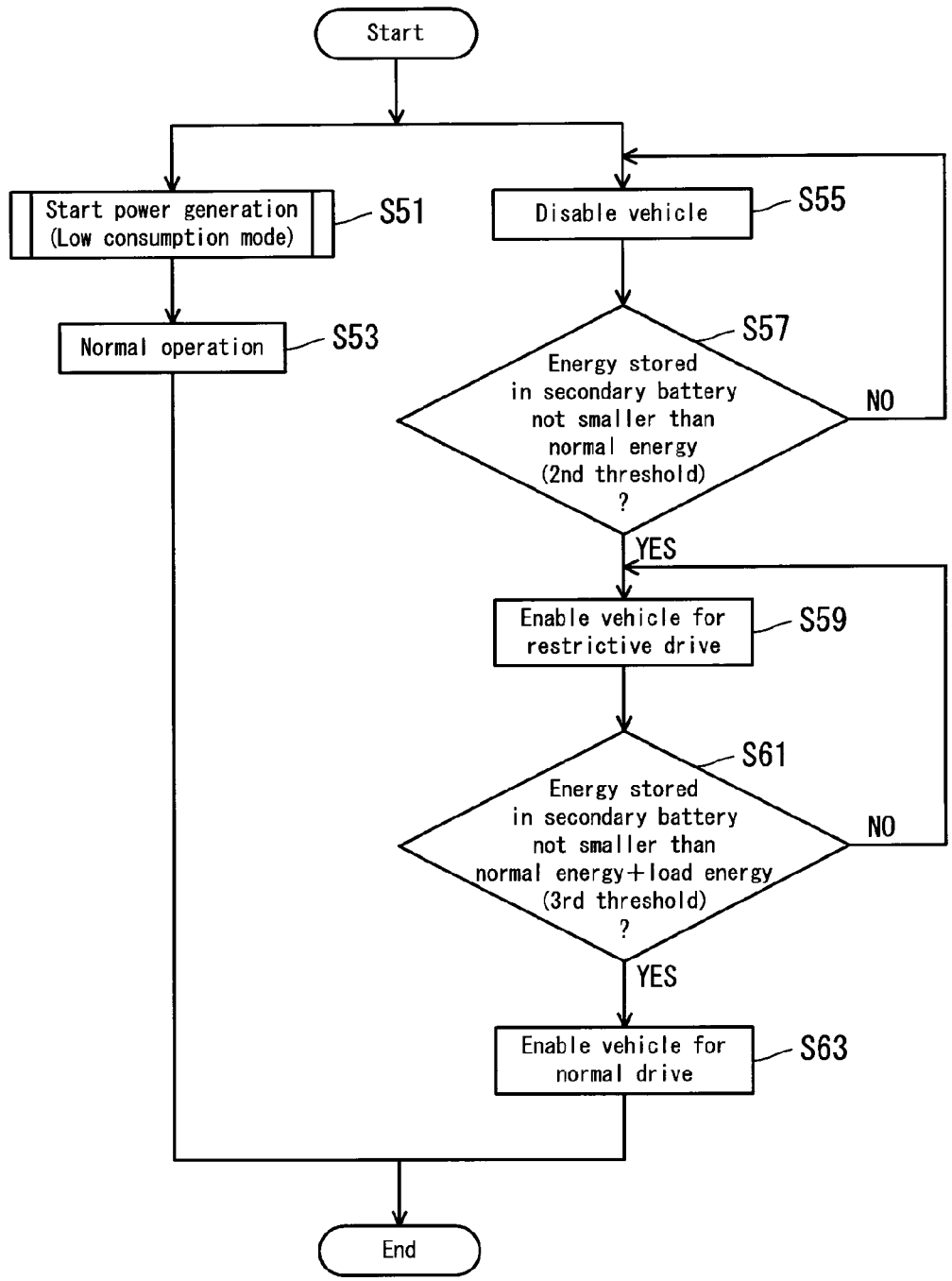
FIG. 13 is a flowchart showing an operation in a case where the fuel cell system is started in a low consumption mode but the vehicle is not enabled for driving.
Figure 14:
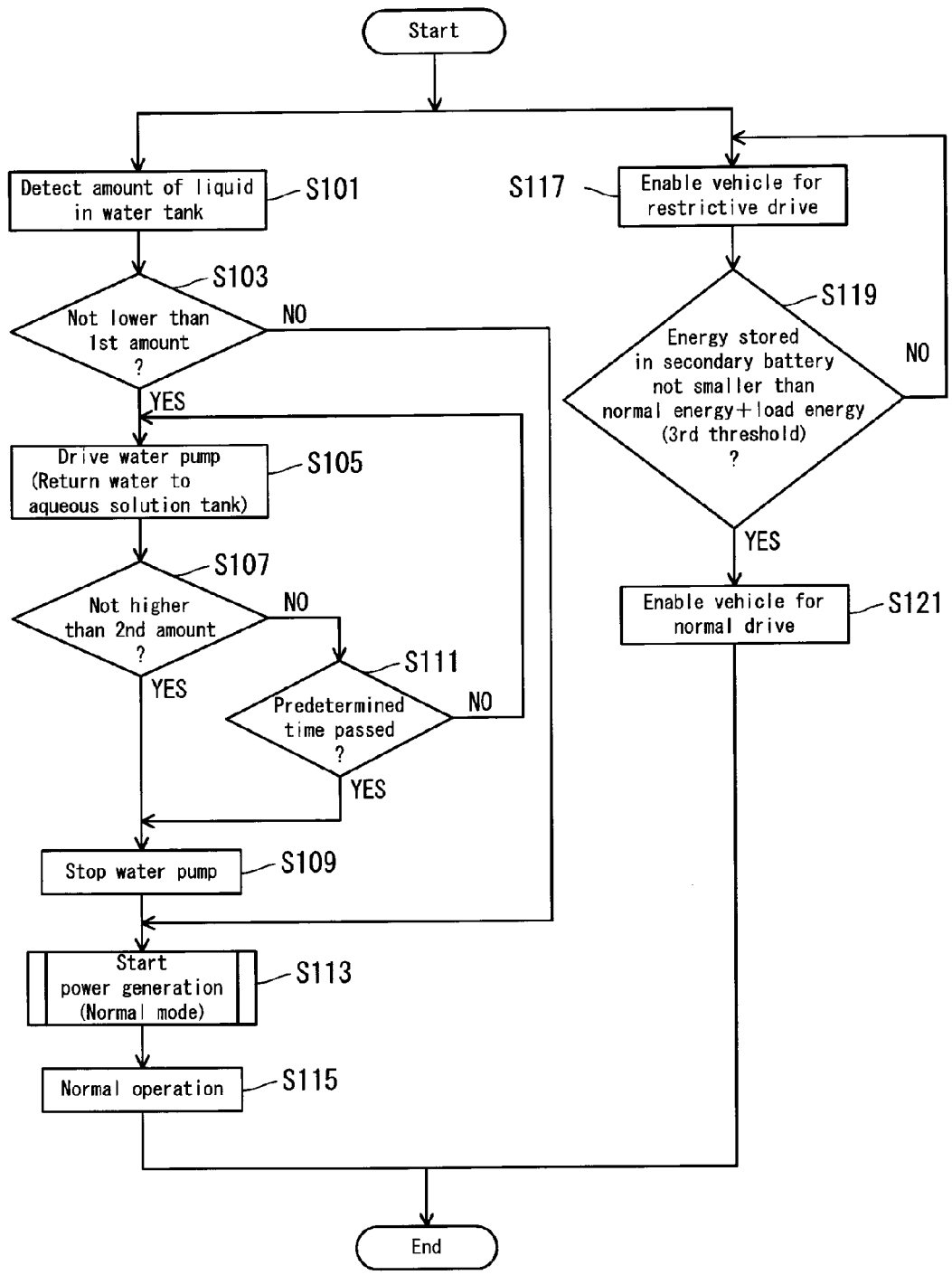
FIG. 14 is a flowchart showing an operation in a case where the fuel cell system is started in a normal mode and the vehicle is enabled for restrictive driving.
Figure 15:
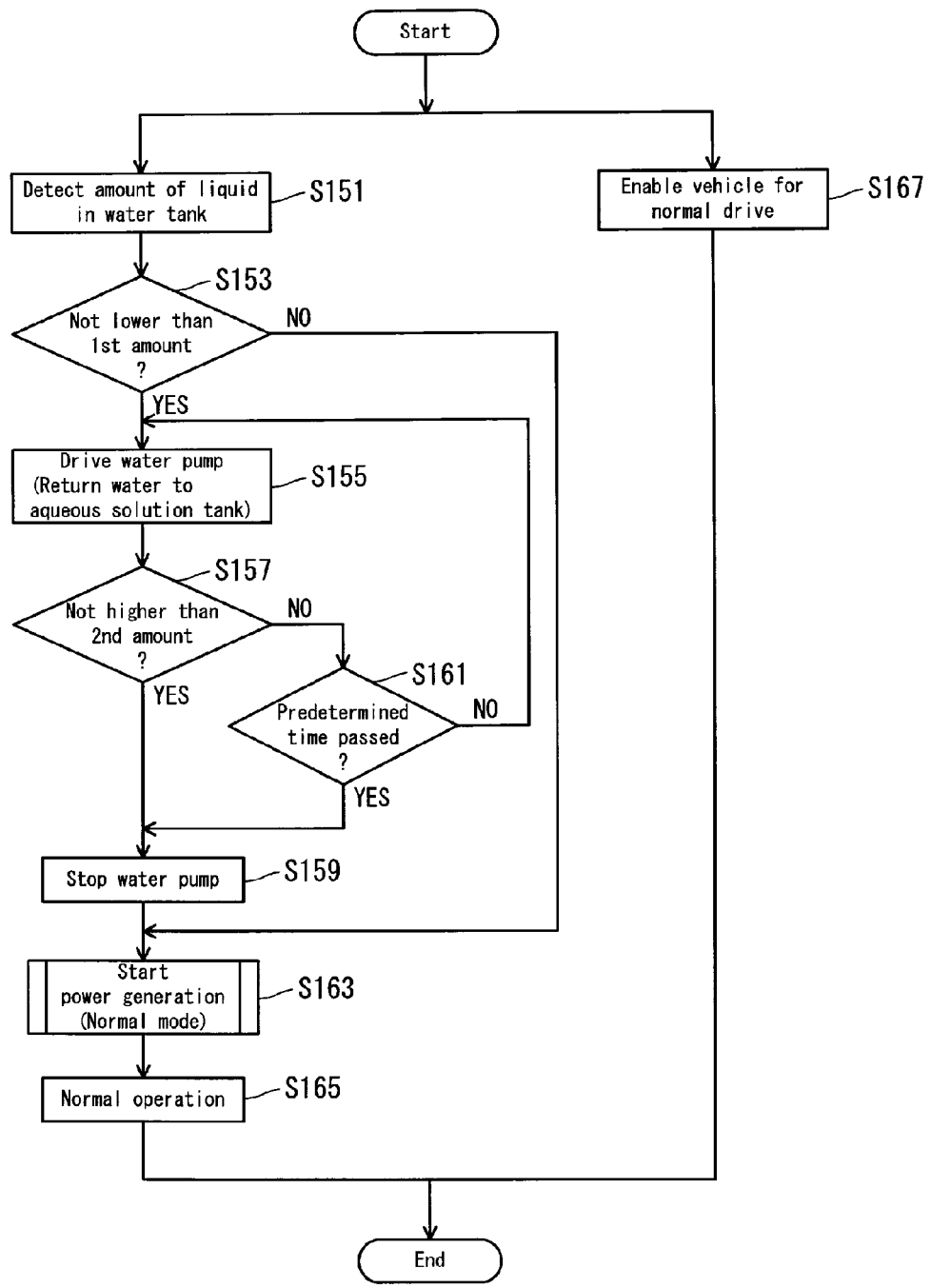
FIG. 15 is a flowchart showing an operation in a case where the fuel cell system is started in the normal mode and the vehicle is enabled for normal driving.
Figure 16:
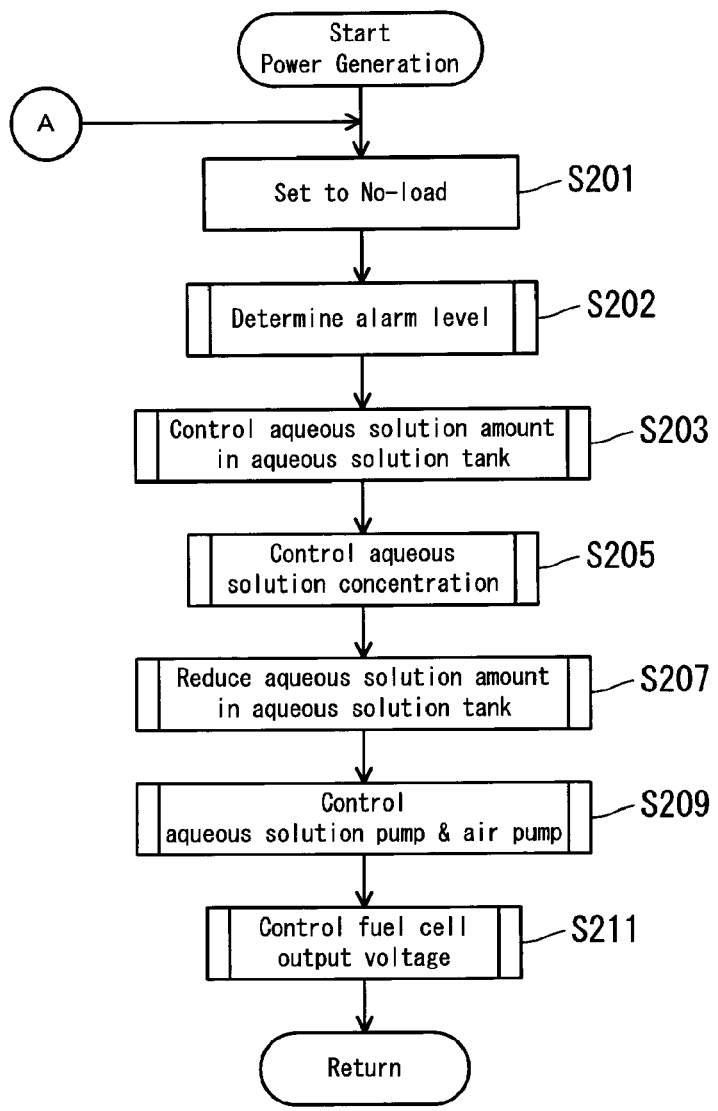
FIG. 16 is a flowchart showing an operation performed at a time when power generation is started.

Further, with reference to FIG. 16, description will cover the operation in Step S51 of FIG. 13, Step S113 of FIG. 14 and Step S163 of FIG. 15 performed at the time power generation is started.

First, the system is brought to a state of no load (Step S201). Specifically, the voltage adjustment circuit 88 opens the electric circuit 90 to drive the fuel cell 12 with no load, and the connection between the fuel cell 12 and the secondary battery 108 is cut off. Under this state, tapping of electric current from the fuel cell 12 is stopped. Then, an alarm level is determined (Step S202). Thereafter, the amount of aqueous solution in the aqueous solution tank 18 is controlled (Step S203), the concentration of aqueous methanol solution S is controlled (Step S205), and the amount of aqueous solution in the aqueous solution tank 18 is decreased (Step S207). Further, the aqueous solution pump 26 and the air pump 34 are controlled (Step S209), and the output voltage of the fuel cell 12 is controlled (Step S211).

The operation in Steps S201 through S211 in FIG. 16 will be described in more specifically.

Figure 17:
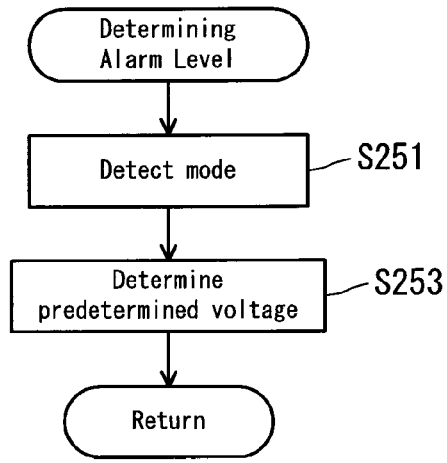
FIG. 17 is a flowchart showing a process of determining an alarm level.

Reference will be made to FIG. 17, to describe a process in Step 202 in FIG. 16, of determining an alarm level.

First, mode detection is performed to see if the current mode is the normal mode or the low consumption mode (Step S251), and based on the detected mode, a predetermined voltage (a lowest voltage at which operation can be performed without damaging the cell) is selected (Step S253). The predetermined voltage as a conversion into a single cell voltage (a voltage in one fuel cell) would be about 0.25V for normal mode and about 0.2V for low consumption mode, for example.

As described, when starting the system in low consumption mode, a lower value is set for the predetermined voltage than when starting the system in normal mode, whereby the connection between the fuel cell 12 and the secondary battery 108 is not cut off (the connection is maintained) and charging to the secondary battery 108 is continued in the low consumption mode, even in cases where the output voltage of the fuel cell 12 reaches a value at which the connection between the fuel cell 12 and the secondary battery 108 would be cut off in the normal mode. This makes it possible to reduce discharge from the secondary battery 108, i.e. to cut down on a decrease in the stored electric energy.

Figure 18:
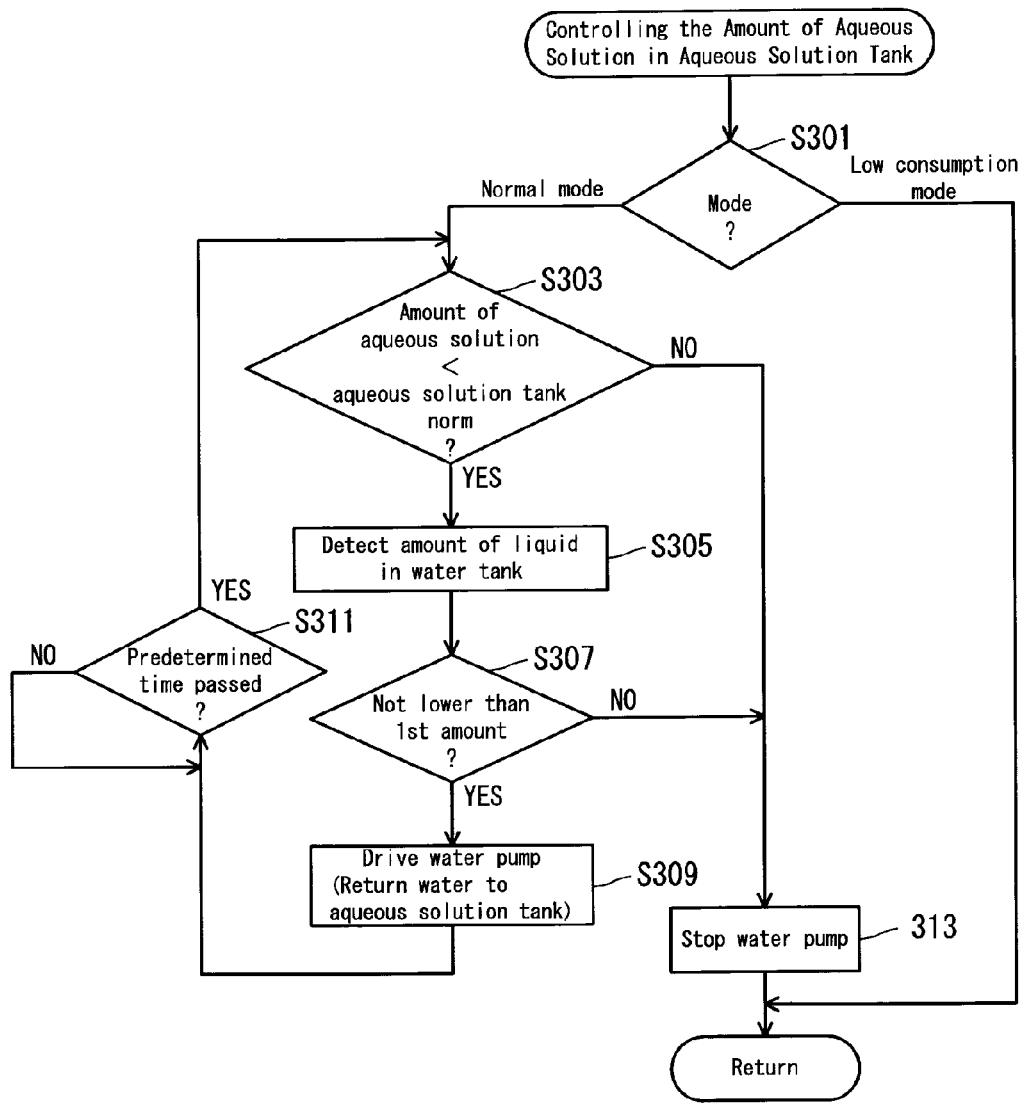
FIG. 18 is a flowchart showing a process of controlling an amount of aqueous solution in an aqueous solution tank.

Reference will now be made to FIG. 18 to describe the process in Step S203 in FIG. 16, of controlling the amount of aqueous solution in the aqueous solution tank 18.

First, the mode is checked (Step S301). In normal mode, the system checks on whether or not the amount of aqueous solution detected in the aqueous solution tank 18 by the level sensor 22 is smaller than a predetermined amount of the aqueous solution tank (the amount of aqueous solution in the aqueous solution tank 18 during power generation, which may be one liter for example) (Step S303). If smaller, the level sensor 54 detects the amount of liquid (amount of water) in the water tank 44 (Step S305), and the system checks on whether or not the detected amount of liquid is not smaller than a first predetermined amount (250 cc for example) (Step S307). If the detected amount of liquid is not smaller than the first predetermined amount, the water pump 60 is driven and water is returned to the aqueous solution tank 18 (Step S309). This operation is continued until Step S311 determines that a predetermined amount of time has passed, and the process goes back to Step S303 if the predetermined amount of time has passed.

If Step S303 determines that the amount of aqueous solution in the aqueous solution tank 18 is not smaller than the predetermined amount, or Step S307 determines that the amount of liquid is smaller than the first predetermined amount, the water pump 60 is stopped (Step S313).

On the other hand, if the detected mode is the low consumption mode, no control is made on the amount of aqueous solution in the aqueous solution tank 18.

As described, there is no need for driving the water pump 60 when starting in low consumption mode, since no control of the amount of aqueous solution in the aqueous solution tank 18 is made. Therefore, it is possible to reduce power consumption.

Figure 19:
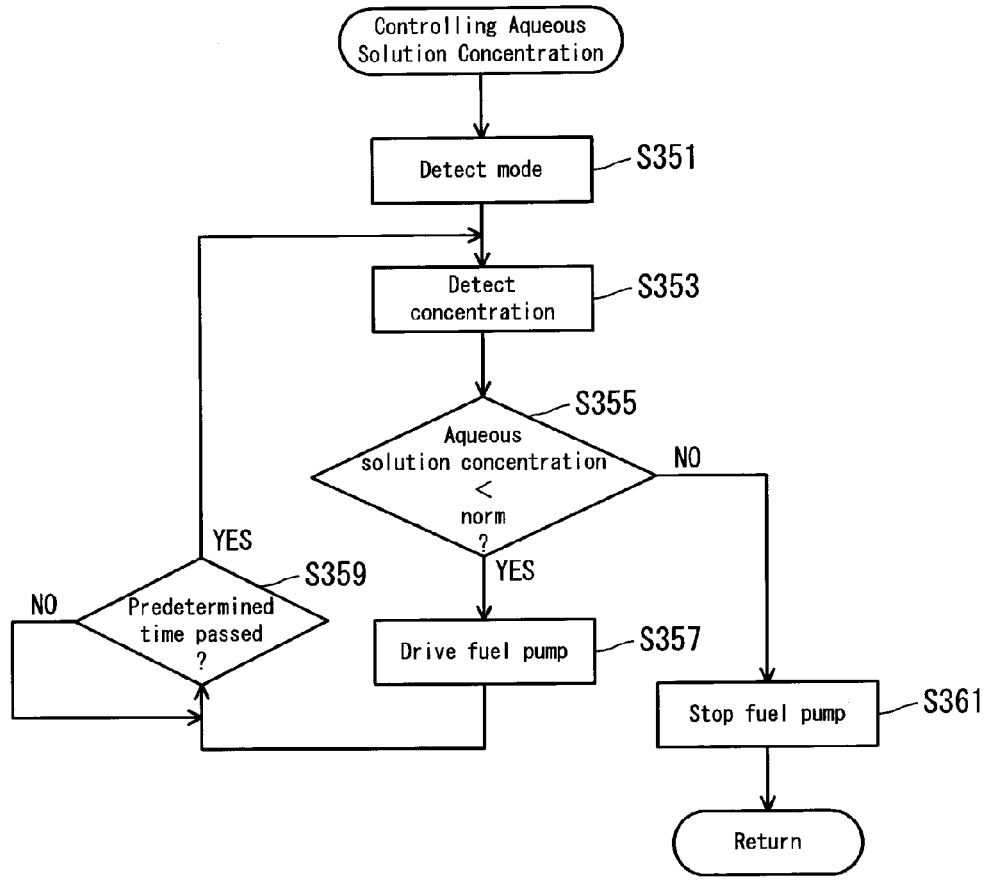
FIG. 19 is a flowchart showing a process of controlling a concentration of aqueous methanol solution.

Referring to FIG. 19, description will now cover the concentration control on aqueous methanol solution S in Step S205 in FIG. 16. In this process, the concentration of the aqueous methanol solution S is preferably set to be higher than the concentration for the normal operation.

First, mode detection is performed to see if the current mode is normal mode or low consumption mode (Step S351). Then, the concentration sensor 64 detects the concentration of aqueous methanol solution S (Step S353), and the system checks on whether or not the detected concentration of aqueous methanol solution S is lower than a predetermined concentration for the detected mode (Step S355). The predetermined concentration is assigned to each mode, and the concentration value is different between the normal mode and the low consumption mode. Although the predetermined concentration in the normal mode varies depending upon the temperature of the fuel cell 12, an ambient temperature, etc., the value is higher than the concentration for the normal operation. On the other hand, in low consumption mode, the value is even higher than the setting for the normal mode by about 2 wt % to about 5 wt %. As an example, when the ambient temperature is about 20° C., the predetermined concentration is set to about 6% for normal mode and about 8% for low consumption mode.

If Step S355 determines that the concentration of aqueous methanol solution S is lower than the predetermined concentration, the fuel pump 20 is driven (Step S357). The operation is continued until Step S359 determines that a predetermined amount of time has passed. When the predetermined amount of time has passed, the process goes back to Step S353. If Step S355 determines that the concentration of aqueous methanol solution S is not lower than the predetermined concentration, the fuel pump 20 is stopped (Step S361).

As described, when starting the system in low consumption mode, power generation is started with a supply of aqueous methanol solution S to the fuel cell 12 at a higher concentration than when starting the system in normal mode. Although this increases crossover and decreases efficiency, the temperature rises quickly, making it possible to shorten the necessary time to attain the target temperature.

Figure 20:
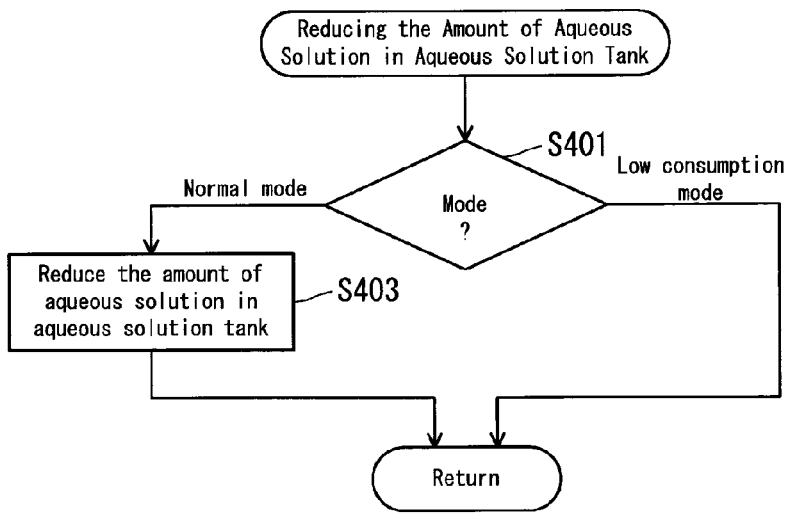
FIG. 20 is a flowchart showing a process of decreasing the amount of aqueous solution in the aqueous solution tank.

Referring to FIG. 20, description will now cover the process of decreasing the amount of aqueous solution in the aqueous solution tank 18 in Step S207 in FIG. 16.

First, the mode is checked (Step S401). In normal mode, the water pump 60 is driven to move aqueous methanol solution S from the aqueous solution tank 18 to the water tank 44, whereby the amount of aqueous methanol solution S in the aqueous solution tank 18 is decreased (Step S403). On the other hand, the water pump 60 is not driven in low consumption mode, i.e. the control process of decreasing the amount of aqueous methanol solution S in the aqueous solution tank 18 is not performed.

As described, there is no need for driving the water pump 60 when starting the system in low consumption mode because the control process of decreasing the amount of aqueous methanol solution in the aqueous solution tank 18 is not performed. This makes possible to decrease power consumption.

Figure 21:
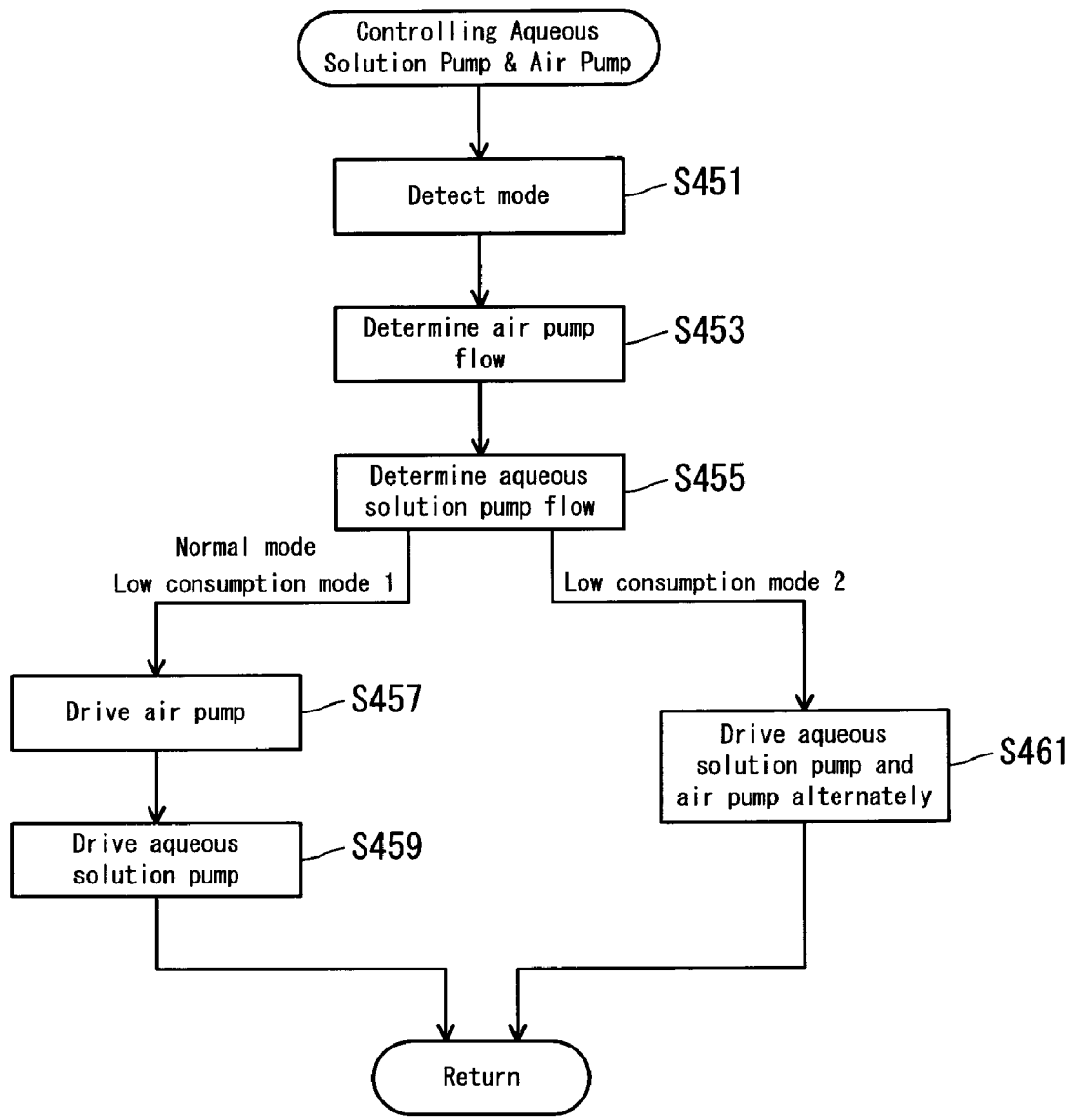
FIG. 21 is a flowchart showing a process of controlling an aqueous solution pump and an air pump.

Referring to FIG. 21, description will now cover the process of controlling the aqueous solution pump 26 and the air pump 34 in Step S209 in FIG. 16.

First, mode detection is made to see if the current mode is normal mode or low consumption mode (Step S451). Then, the system determines an amount of air flow to be supplied by the air pump 34 for the detected mode (Step S453). For example, in a normal mode, the amount of air flow to be supplied by the air pump 34 is set to three times the theoretical demand, and two times the theoretical demand in a low consumption mode 1. It should be noted here that the amount of air flow to be supplied by the air pump 34 in the low consumption mode 1 is preferably not smaller than about 20% and smaller than about 100% of the value for the normal mode. Next, the system determines an amount of flow of aqueous methanol solution S to be supplied by the aqueous solution pump 26, for the detected mode (Step S455). For example, in the normal mode the amount of flow of aqueous solution to be supplied by the aqueous solution pump 26 is preferably set to the same amount as in normal power generation, whereas the flow is set to a minimum required in the low consumption mode 1.

Then, in the normal mode or the low consumption mode 1, the air pump 34 is driven, and the amount of air flow determined for the particular mode is supplied to the cathode 12c of the fuel cell 12 (Step S457). Likewise, the aqueous solution pump 26 is driven, and the amount of flow of aqueous methanol solution S determined for the mode is supplied to the anode 12b of the fuel cell 12 (Step S459).

In a low consumption mode 2, the aqueous solution pump 26 and the air pump 34 are driven alternately with each other (Step S461). This prevents excessive voltage drop caused by driving both of the pumps simultaneously.

As described, power consumption by the air pump 34 can be decreased when starting in the low consumption mode 1 by starting power generation with a lower output of the air pump 34 than in the normal mode.

When starting in the low consumption mode 2, the amount of flow is decreased in the supply of air and aqueous methanol solution S, and the air pump 34 and the aqueous solution pump 26 are driven alternately and not simultaneously. This makes it possible to reduce power consumption by the air pump 34 and the aqueous solution pump 26, and therefore to cut down on a decrease in the electric energy stored in the secondary battery 108.

Figure 22:
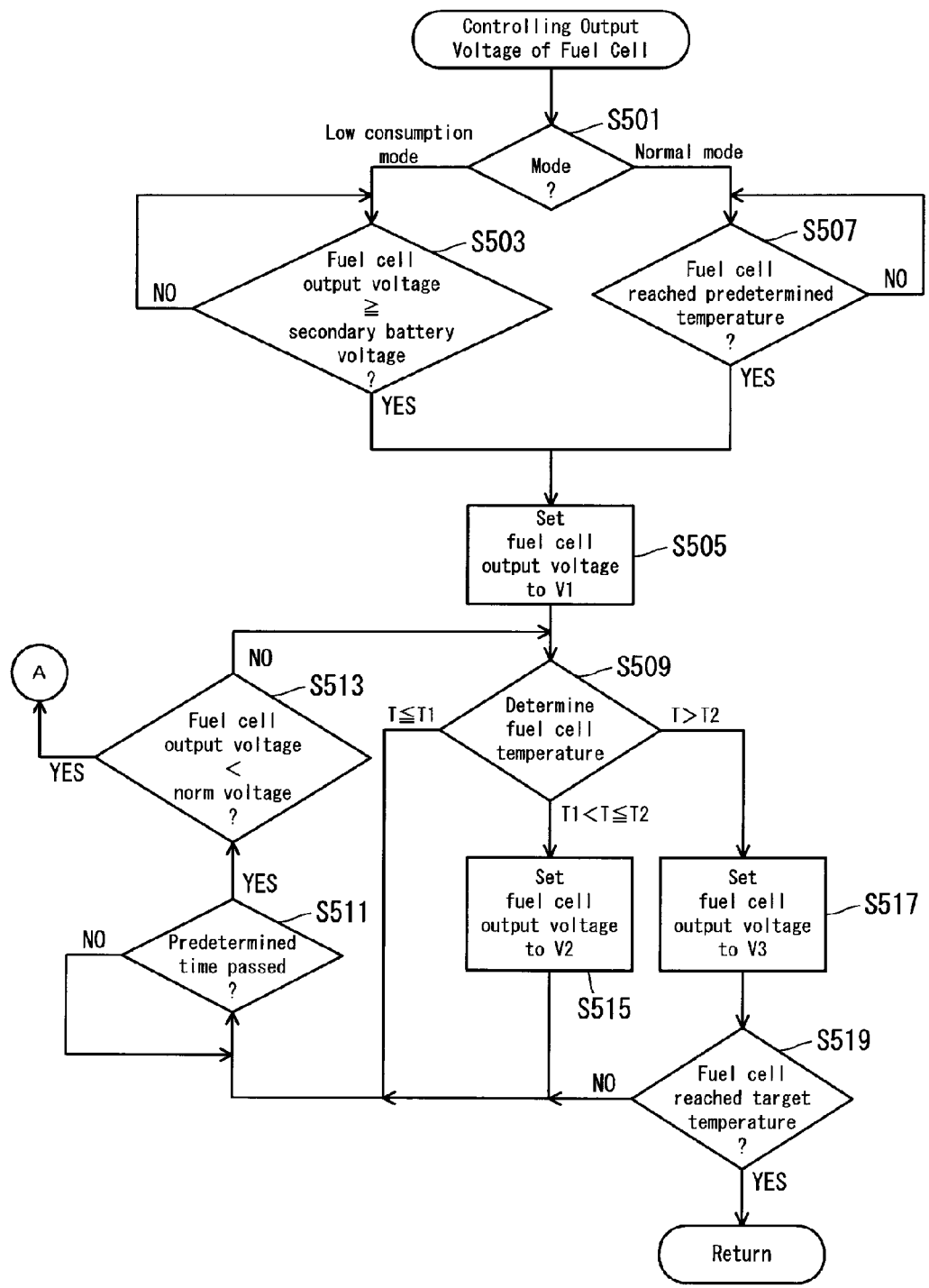
FIG. 22 is a flowchart showing a process of controlling an output voltage of a fuel cell.

Referring to FIG. 22, description will now cover the process of controlling the fuel cell's output voltage.

First, mode detection is made to see if the current mode is normal mode or low consumption mode (Step S501).

In low consumption mode, the system checks on whether or not the output voltage of the fuel cell 12 is not lower than the voltage of the secondary battery 108 (Step S503), and the process waits until the output voltage of the fuel cell 12 is not lower than the voltage of the secondary battery 108. When the output voltage of the fuel cell 12 is not lower than the voltage of the secondary battery 108, the output voltage of the fuel cell 12 is set to V1 which is a value for the low consumption mode (Step S505).

In normal mode on the other hand, the system checks on whether or not the temperature of the fuel cell 12 has reached a predetermined temperature (Step S507), and the process waits until the temperature of the fuel cell 12 has reached the predetermined temperature. When the temperature of the fuel cell 12 has reached the predetermined temperature, the process goes to Step S505, and the output voltage of the fuel cell 12 is set to V1 which is the value for the normal consumption mode. The output voltage of the fuel cell 12 is set by the voltage adjustment circuit 88.

Then, a temperature T of the fuel cell 12 is checked (Step S509), and the output voltage of the fuel cell 12 is set, based on the mode and the temperature T. If the temperature T is not higher than T1, the process waits until a predetermined amount of time has passed (Step S511). When the predetermined amount of time has passed, the system checks on whether or not the output voltage of the fuel cell 12 is smaller than a predetermined voltage (Step S513). In terms of single-cell voltage, the system checks, for example, if the single-cell voltage is lower than about 0.25V for the normal mode, or if the single-cell voltage is lower than about 0.2V for the low consumption mode. If the output voltage of the fuel cell 12 is lower than the predetermined voltage, the process goes back to Step S201 in FIG. 16, where the system is set to no load, and tapping of the electric current from the fuel cell 12 is stopped. On the other hand, if the output voltage of the fuel cell 12 is not lower than the predetermined voltage, tapping of electric current from the fuel cell 12 is continued, and the process goes back to Step S509.

If Step S509 determines that the temperature T is higher than T1 and not higher than T2, the output voltage of the fuel cell 12 is set to V2 (Step S515), and the process goes to Step S511. When the temperature T is higher than T2, the output voltage of the fuel cell 12 is set to V3 (Step S517), and the system checks on whether or not the temperature T of the fuel cell 12 has reached the target temperature (normal operation temperature) (Step S519). If the temperature T has not yet reached the target temperature, the process goes to Step S511, whereas if the target is reached, the process returns and brings the fuel cell system 10 to normal operation. The predetermined temperatures in the present preferred embodiment are, for example, approximately: T1=50° C., T2=60° C., and the target temperature=65° C. Also, the single-cell voltages corresponding to the voltages V1, V2 and V3 are, for example, approximately 0.50V, 0.40V and 0.35V for normal mode respectively, while being approximately 0.40V, 0.35V and 0.25V for low consumption mode respectively. Lowering the output voltage of the fuel cell 12 makes it possible to increase the charge current to the secondary battery 108.

As described, when starting in low consumption mode, no-load operation of the fuel cell 12 is terminated and the output voltage of the fuel cell 12 is set to V1 once the output voltage of the fuel cell 12 is not lower than the voltage of the secondary battery 108 even if the fuel cell 12 has not yet attained a predetermined temperature. This arrangement makes it possible to shorten the time of no-load operation and the time to attain the target temperature.

FIG. 23(a) shows the temperature of the fuel cell 12 and the output voltage of the fuel cell 12 in the normal mode. FIG. 23(b) shows the temperature of the fuel cell 12 and the output voltage of the fuel cell 12 in the low consumption mode.

From FIGS. 23(a) and 23(b), it is understood that switching from no-load operation to an operation at the output voltage V1 from the fuel cell 12 takes place at an earlier time point in low consumption mode than in normal mode. This is because, as described above, the system will set the output voltage of the fuel cell 12 to V1 in the low consumption mode as soon as the output voltage of the fuel cell 12 is not lower than the voltage of the secondary battery 108. In the normal mode, the system is still in no-load operation at this point.

Also, when starting the system in low consumption mode, output voltage setting values V1, V2 and V3 from the fuel cell 12 are lower than those when starting the system in normal mode at the same fuel cell temperature. This makes it possible to increase the output current from the fuel cell 12 in low consumption mode over the output current in normal mode, and thereby to charge the secondary battery 108 quickly. Temperature rise in the fuel cell 12 is quicker, too, and it is possible to switch to normal operation at an earlier time.

According to the fuel cell system 10 as described, a start-up mode of the fuel cell system 10 is determined on the basis of electric energy stored in the secondary battery 108 and a threshold value obtained from calculation, and the fuel cell system 10 is operated in accordance with the determined start-up mode. This makes it possible to select an optimum start-up mode suitable for the electric energy (amount of charge) stored in the secondary battery 108, eliminating problems when starting the fuel cell system 10.

Specifically, the amount of charge in the secondary battery 108 is converted into an amount of stored electric energy, and this stored electric energy is compared to the first threshold value which is the low-consumption energy itself, i.e. the amount of energy necessary for starting the fuel cell system 10 in low consumption mode. If the electric energy stored in the secondary battery 108 is not smaller than the first threshold value, the fuel cell system 10 is started. On the other hand, if the electric energy stored in the secondary battery 108 is smaller than the first threshold value, the system determines that the fuel cell system 10 cannot be started even in the low consumption mode, and stops starting the fuel cell system 10. This makes it possible to avoid unnecessary energy consumption.

Also, if the electric energy stored in the secondary battery 108 is not smaller than the second threshold value which is the normal-consumption energy itself, i.e. the amount of energy which is necessary to start the fuel cell system 10 in normal mode, the fuel cell system 10 is started in normal mode. On the other hand, if the electric energy stored in the secondary battery 108 is smaller than the second threshold value, the fuel cell system 10 is started in low consumption mode. Following the process described above, it is possible to start the fuel cell system 10 in a mode appropriate for the electric energy stored in the secondary battery 108.

Further, if the electric energy stored in the secondary battery 108 is not smaller than the third threshold value, which is the very sum of the normal-consumption energy and the load energy demand, the vehicle is enabled for normal driving. On the other hand, if the electric energy stored in the secondary battery 108 is smaller than the third threshold value, the vehicle is enabled for driving in a mode other than the normal driving. As described, the vehicle is made drivable within a range allowable by the electric energy stored in the secondary battery 108.

The fuel cell system 10 described above is suitably used in vehicles which require that the capacity of the secondary battery 108 be small.

It should be noted here that in the above-described various preferred embodiments, the thresholds are preferably provided by values of energy, and the threshold values are preferably compared to the electric energy stored in the secondary battery 108. However, the present invention is not limited to this. The thresholds may be provided by the amount of charge, so that those threshold values are compared to the amount of charge in the secondary battery 108. In this case, energy is converted to the amount of charge so that it can be used as a threshold value. Also, the thresholds may be provided by the voltage, so that those threshold values are compared to the voltage values of the secondary battery 108; or the thresholds may be provided by the current, so that those threshold values are compared to the values of current flowing in the secondary battery 108.

Figure 24:
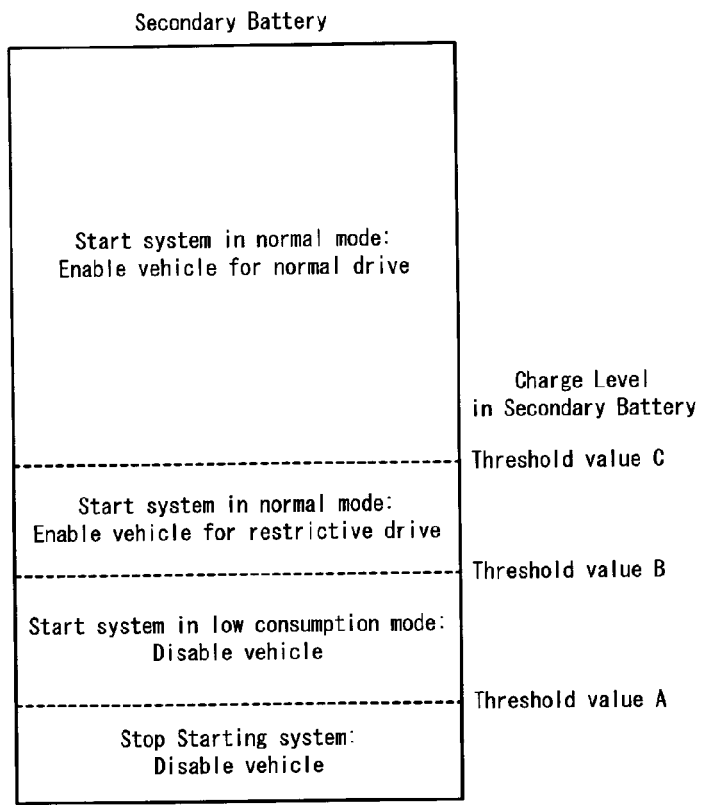
FIG. 24 is a schematic diagram for describing another preferred embodiment of the present invention.

In the preferred embodiments described above, threshold values for determining the start-up mode are preferably obtained by calculation. However, this may be replaced by the following arrangement. For example, as shown in FIG. 24, three threshold values A, B and C are predetermined for the amount of charge in the secondary battery 108, to define four categories. In this case, after the main switch is turned ON, the amount of charge in the secondary battery 108 is detected, the category in which the amount of charge falls is determined, and a process assigned to this particular category is performed.

Specifically, if the amount of charge is not greater than the threshold value A, the fuel cell system 10 is not started, or the vehicle is not enabled, either. If the amount of charge is greater than the threshold value A and not greater than the threshold value B, the fuel cell system 10 is started in low consumption mode but the vehicle is not enabled. If the amount of charge is greater than the threshold value B and not greater than the threshold value C, the fuel cell system 10 is started in normal mode and the vehicle is enabled for restrictive driving. If the amount of charge is greater than the threshold value C, the fuel cell system 10 is started in the normal mode and the vehicle is enabled for normal driving.

According to the present preferred embodiment, the start-up mode can be set easily.

Figure 25:
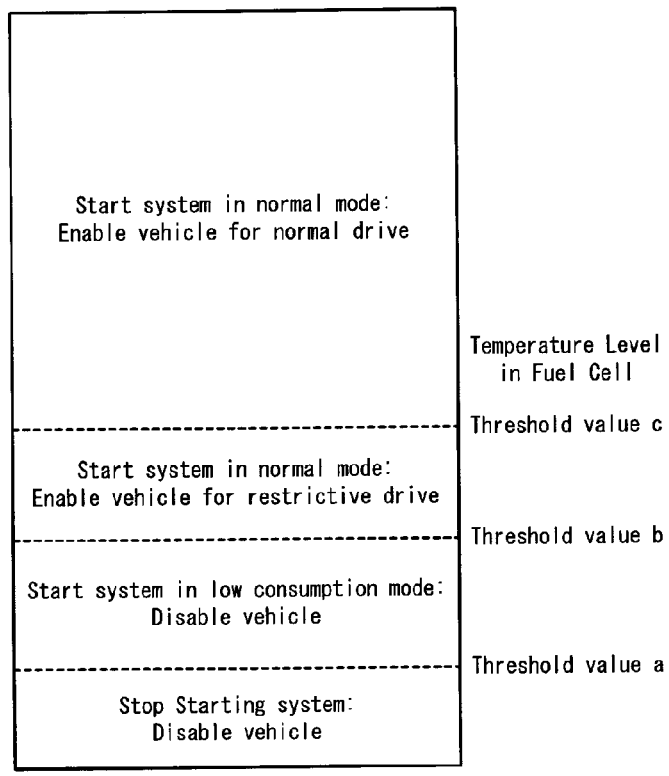
FIG. 25 is a schematic diagram for describing another preferred embodiment of the present invention.

Also, the threshold for determining the start-up mode may be the temperature of the fuel cell 12. For example, as shown in FIG. 25, three threshold values a, b and c are predetermined for the temperature of the fuel cell 12, to define four categories. In this case, after the main switch is turned ON, the temperature of the fuel cell 12 is detected, the category in which the temperature falls is determined, and a process assigned to this particular category is performed.

Specifically, if the temperature is not higher than the threshold value a, the fuel cell system 10 is not started, or the vehicle is not enabled, either. If the temperature is higher than the threshold value a and not higher than the threshold value b, the fuel cell system 10 is started in the low consumption mode but the vehicle is not enabled. If the temperature is higher than the threshold value b and not higher than the threshold value c, the fuel cell system 10 is started in the normal mode and the vehicle is enabled for restrictive driving. If the temperature is higher than the threshold value c, the fuel cell system 10 is started in the normal mode and the vehicle is enabled for normal driving.

According to the present preferred embodiment, a start-up mode appropriate to the temperature of the fuel cell 12 can be selected, and eliminating a trouble in starting the fuel cell system 10.

It should be noted here that operation speed of the CPU 72 may be lowered in low consumption mode to reduce power consumption.

In the preferred embodiments described above, three threshold values are preferably used and four operation modes are preferably defined for the fuel cell system 10 and the vehicle. However, the present invention is not limited to this.

For example, three operation modes may be defined by using a threshold value D which represents a normal amount of energy necessary for making a normal start of the fuel cell system 10, and a threshold value E which represents a sum of the normal amount of energy necessary for starting of the fuel cell system 10 in normal mode and the load energy demand necessary for making normal driving of the load (D<E). In this case, for example, if the amount of charge in the fuel cell 12 is not greater than the threshold value D, the fuel cell system 10 is not started, or the vehicle is not enabled, either. If the amount of charge is greater than the threshold value D and not greater than the threshold value E, the fuel cell system 10 is started in normal mode and the vehicle is enabled for restrictive driving. If the amount of charge is greater than the threshold value E, the fuel cell system 10 is started in normal mode and the vehicle is enabled for normal driving. It should be noted here that the threshold values D, E may be obtained by calculation based on the temperature of fuel cell 12 or may be predetermined.

In the preferred embodiments described above, methanol is preferably used as fuel and aqueous methanol solution is preferably used as fuel aqueous solution. However the present invention is not limited by this, and the fuel may be provided by other alcoholic fuels such as ethanol, and the aqueous fuel solution may be provided by aqueous solutions of the alcohol, such as aqueous ethanol solution.

In the preferred embodiments described above, description is made for a case where a motorbike is preferably used as a load. However, the present invention is not limited to this. The load may be provided by any transportation equipment other than motorbikes, such as automotive vehicles including four-wheeled automobiles, marine vessels and aircraft.

The present invention is applicable also to fuel cell systems mounted with a reformer, and fuel cell systems where hydrogen is supplied to the fuel cell. Further, the present invention is applicable to small, stationary-type fuel cell systems.

The present invention being thus far described and illustrated in detail, these descriptions and drawings only represent examples of preferred embodiments of the present invention, and should not be interpreted as limiting the invention. The spirit and scope of the present invention is only limited by words used in the accompanied claims.

The invention claimed is:

1. A fuel cell system connected with a load, comprising:
    a fuel cell;
    a secondary battery electrically connected with the fuel cell;
    a temperature detector arranged to detect a temperature of the fuel cell; and
    a calculation unit arranged to calculate a threshold value that represents energy necessary to start the fuel cell system, based on the temperature of the fuel cell detected by the temperature detector; wherein
    the threshold value is used to determine a start-up mode of the fuel cell system; and
    the fuel cell system further comprises a memory arranged to store a value of low-consumption electric power necessary to start the fuel cell system in a low consumption mode, wherein the calculation unit includes a time calculation unit arranged to determine a necessary time for the fuel cell to attain a target temperature based on the temperature of the fuel cell detected by the temperature detector, and a threshold value calculation unit arranged to calculate another threshold value representing low-consumption energy necessary to start the fuel cell system in the low consumption mode based on the necessary time and the low-consumption electric power stored in the memory, and the another threshold value is included in the threshold value and used to determine whether or not to start the fuel cell system.

2. The fuel cell system according to claim 1, wherein the load includes at least a motor of transportation equipment.

3. A fuel cell system connected with a load, comprising:
    a fuel cell;
    a secondary battery electrically connected with the fuel cell;
    a temperature detector arranged to detect a temperature of the fuel cell; and
    a calculation unit arranged to calculate a threshold value that represents energy necessary to start the fuel cell system, based on the temperature of the fuel cell detected by the temperature detector; wherein
    the threshold value is used to determine a start-up mode of the fuel cell system; and
    the fuel cell system further comprises a memory arranged to store a value of normal electric power necessary to start the fuel cell system in a normal mode, wherein the calculation unit includes a time determining unit arranged to determine a necessary time for the fuel cell to attain a target temperature based on the temperature of the fuel cell detected by the temperature detector, a threshold value calculating unit arranged to calculate another threshold value representing normal-consumption energy necessary to start the fuel cell system in the normal mode based on the necessary time and the normal electric power stored in the memory, and the another threshold value is included in the threshold value and used to determine whether or not the fuel cell system is started in the normal mode.

4. The fuel cell system according to claim 3, wherein the load includes at least a motor of transportation equipment.

5. A fuel cell system connected with a load, comprising:
    a fuel cell;
    a secondary battery electrically connected with the fuel cell;
    a temperature detector arranged to detect a temperature of the fuel cell; and
    a calculation unit arranged to calculate a threshold value that represents energy necessary to start the fuel cell system, based on the temperature of the fuel cell detected by the temperature detector; wherein
    the threshold value is used to determine a start-up mode of the fuel cell system; and
    the fuel cell system further comprises a memory arranged to store a value of normal electric power necessary to start the fuel cell system in a normal mode, and a value of unit energy necessary for driving the load normally, another calculation unit arranged to calculate another threshold value to determine whether or not to drive the load normally, the another calculation unit includes a time determination unit arranged to determine a necessary time for the fuel cell to attain a target temperature based on the temperature of the fuel cell detected by the temperature detector, and a threshold value calculation unit arranged to calculate another threshold value representing a sum of normal-consumption energy necessary to start the fuel cell system in the normal mode and a load energy demand necessary to drive the load normally, based on the necessary time, the normal electric power and the unit energy.

6. The fuel cell system according to claim 5, wherein the load includes at least a motor of transportation equipment.

7. A method of starting a fuel cell system including a fuel cell and a secondary battery electrically connected with the fuel cell, the fuel cell system being connected with a load; the method comprising:

a first step of detecting a temperature of the fuel cell; and a second step of calculating a threshold value representing energy necessary for starting the fuel cell system based on the detected temperature of the fuel cell; wherein the threshold value is used for determining a start-up mode of the fuel cell system; and the second step includes a step of determining a necessary time for the fuel cell to attain a target temperature, based on the detected temperature of the fuel cell, and a step of calculating another threshold value representing low-consumption energy necessary for starting the fuel cell system in a low consumption mode based on the necessary time and low-consumption electric power necessary for starting the fuel cell system in the low consumption mode, wherein the another threshold value is included in the threshold value and used for determining whether or not to start the fuel cell system.

8. A method of starting a fuel cell system including a fuel cell and a secondary battery electrically connected with the fuel cell, the fuel cell system being connected with a load; the method comprising:

a first step of detecting a temperature of the fuel cell; and a second step of calculating a threshold value representing energy necessary for starting the fuel cell system based on the detected temperature of the fuel cell; wherein the threshold value is used for determining a start-up mode of the fuel cell system; and the second step includes a step of determining a necessary time for the fuel cell to attain a target temperature based on the detected temperature of the fuel cell, and a step of calculating another threshold value representing normal-consumption energy necessary for starting the fuel cell system in a normal mode based on the necessary time and normal electric power necessary for starting the fuel cell system in the normal mode, wherein the another threshold value is included in the threshold value and used for determining whether or not to start the fuel cell system in the normal mode.

9. A method of starting a fuel cell system including a fuel cell and a secondary battery electrically connected with the fuel cell, the fuel cell system being connected with a load; the method comprising:

a first step of detecting a temperature of the fuel cell; and a second step of calculating a threshold value representing energy necessary for starting the fuel cell system based on the detected temperature of the fuel cell; wherein the threshold value is used for determining a start-up mode of the fuel cell system; and the method further comprises:

a step of determining a necessary time for the fuel cell to attain a target temperature based on the detected temperature of the fuel cell; and a step of calculating another threshold value representing a sum of normal-consumption energy necessary for starting the fuel cell system in a normal mode and a load energy demand necessary for driving the load normally, based on the necessary time, normal electric power necessary for starting the fuel cell system in the normal mode, and unit energy necessary for driving the load normally; wherein the another threshold value is used for determining whether or not to drive the load normally.

* * * * *